US008837907B2

(12) United States Patent
Date et al.

(10) Patent No.: US 8,837,907 B2
(45) Date of Patent: Sep. 16, 2014

(54) RECORDING APPARATUS, RECORDING METHOD, IMAGE PICKUP APPARATUS, REPRODUCING APPARATUS AND VIDEO SYSTEM

(71) Applicant: Sony Corporation, Tokyo (JP)

(72) Inventors: Osamu Date, Tokyo (JP); Satoshi Tsujii, Tokyo (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/084,007

(22) Filed: Nov. 19, 2013

(65) Prior Publication Data

US 2014/0105579 A1 Apr. 17, 2014

Related U.S. Application Data

(63) Continuation of application No. 12/281,339, filed as application No. PCT/JP2007/071655 on Nov. 7, 2007, now Pat. No. 8,620,141.

(30) Foreign Application Priority Data

Nov. 29, 2006 (JP) ................. 2006-321178

(51) Int. Cl.
| G06F 21/00 | (2013.01) |
| G11B 27/02 | (2006.01) |
| H04N 9/67 | (2006.01) |
| H04N 9/82 | (2006.01) |
| H04N 9/79 | (2006.01) |
| H04N 9/873 | (2006.01) |
| H04N 9/804 | (2006.01) |

(52) U.S. Cl.
CPC ............. *H04N 9/873* (2013.01); *G11B 27/02* (2013.01); *H04N 9/67* (2013.01); *H04N 9/8233* (2013.01); *H04N 9/8205* (2013.01); *H04N 9/7921* (2013.01); *H04N 9/8045* (2013.01); *H04N 9/8042* (2013.01)
USPC ........... 386/248; 386/302; 386/328; 386/329; 386/356

(58) Field of Classification Search
USPC .......................... 386/248, 302, 328, 329, 356
See application file for complete search history.

(56) References Cited

U.S. PATENT DOCUMENTS

| 6,754,279 B2 | 6/2004 | Zhou et al. |
| 7,916,202 B2 | 3/2011 | Suenaga et al. |

(Continued)

FOREIGN PATENT DOCUMENTS

| EP | 1 432 237 A2 | 6/2004 |
| EP | 1 569 471 A1 | 8/2005 |

(Continued)

OTHER PUBLICATIONS

Shinya Kadono, et al., "Revised Edition H.264/AVC Textbook", Impress R&D, Jan. 1, 2006, pp. 308-310 (with partial English translation).

(Continued)

*Primary Examiner* — Michael Simitoski
*Assistant Examiner* — Gary Lavelle
(74) *Attorney, Agent, or Firm* — Oblon, Spivak, McClelland, Maier & Neustadt, L.L.P.

(57) ABSTRACT

A video is recorded on a recording medium so that a reproducing apparatus can faithfully reproduce an original color of the recorded video. An sRGB color space or an extended sRGB color space is specified as the color space of the video to be recorded. A signal processing unit generates a video signal corresponding to the specified color space. An encoding/decoding unit compresses the video signal in accordance with the MPEG4-AVC standard to generate a compressed video signal. A CPU generates a color space identifier including information indicating the color space specified and is configured so that an access unit including an SPS NAL unit in the compressed video signal includes an SEI NAL unit in which the color space identifier is stored. The video recorded on the recording medium includes the color space identifier having information for a color space of that video.

17 Claims, 25 Drawing Sheets

| Byte | 7 | 6 | 5 | 4 | 3 | 2 | 1 | 0 |
|---|---|---|---|---|---|---|---|---|
| 0 | VERSION INFORMATION ||| DATA SIZE || DATA IDENTIFIER ||
| 1 | COLOR SPACE INFORMATION ||| COLOR PRECISION INFORMATION || RESERVED AREA ||
| 2 | MAXIMUM VALUE OF COLOR GAMUT OF RED |||| MINIMUM VALUE OF COLOR GAMUT OF RED ||||
| 3 | MAXIMUM VALUE OF COLOR GAMUT OF GREEN |||| MINIMUM VALUE OF COLOR GAMUT OF GREEN ||||
| 4 | MAXIMUM VALUE OF COLOR GAMUT OF BLUE |||| MINIMUM VALUE OF COLOR GAMUT OF BLUE ||||

(56) References Cited

U.S. PATENT DOCUMENTS

| | | |
|---|---|---|
| 2002/0044756 A1 | 4/2002 | Ishii |
| 2004/0119843 A1 | 6/2004 | Hoshuyama |
| 2005/0122410 A1 | 6/2005 | Hattori |
| 2005/0152612 A1 | 7/2005 | Spaulding et al. |
| 2006/0146196 A1 | 7/2006 | Suenaga et al. |
| 2006/0182418 A1 | 8/2006 | Yamagata et al. |
| 2006/0222324 A1 | 10/2006 | Abe |
| 2007/0229862 A1 | 10/2007 | Derhak et al. |
| 2008/0100551 A1 | 5/2008 | Haga et al. |
| 2008/0137732 A1 | 6/2008 | Sekiguchi et al. |
| 2008/0246855 A1 | 10/2008 | Hoshuyama |
| 2011/0141302 A1 | 6/2011 | Hoshuyama |
| 2011/0150333 A1 | 6/2011 | Suenaga et al. |

FOREIGN PATENT DOCUMENTS

| | | |
|---|---|---|
| JP | 10-191388 | 7/1998 |
| JP | 2004-96400 | 3/2004 |
| JP | 2004-077837 | 9/2004 |
| JP | 2005-192197 | 7/2005 |
| JP | 2006-119295 | 5/2006 |
| JP | 2007-251891 | 9/2007 |
| WO | WO 2005/120060 A1 | 12/2005 |
| WO | WO 2007/023698 A1 | 3/2007 |
| WO | WO 2007/125697 A1 | 11/2007 |

OTHER PUBLICATIONS

Office Action issued Feb. 1, 2011 in Japanese Patent Application No. 2006-321178 (with English translation).

Extended European Search Report issued Jan. 16, 2012, in European Patent Application No. 07831386.3.

Office Action issued Jan. 10, 2012, in Japanese Patent Application No. 2006-321178 (with English translation).

Thomas Wiegand, Gary Sullivan, Gisle Bjontegaard and Ajay Luthra, Overview of the H.264/AVC Video Coding Standard, Jul. 2003, IEEE, Transactions on Circuits and Systems for Video Technology, vol. 13, No. 7, pp. 560-576.

Alexander MacInnis and Sherman Chen, NAL for H.264 with MPEG-2 Systems, May 10, 2002, access Joint Video Team (JVT) of ISO/IEC MPEG & ITU-T VCEG, JVT-C046, pp. 1-9.

Shijun Sun, Quality Scaleability for FRExt, Jul. 23, 2004, Joint Video Team (JVT) of ISO/IEC MPEG and ITU-T VCEG, retrieved from http://wftp3.itu.int/av-arch/jvt-site/2004_07_Redmond/JVT-L015.doc on Jul. 1, 2012.

FIG. 3

|G1|R|G1|R|
|B|G2|B|G2|
|G1|R|G1|R|
|B|G2|B|G2|

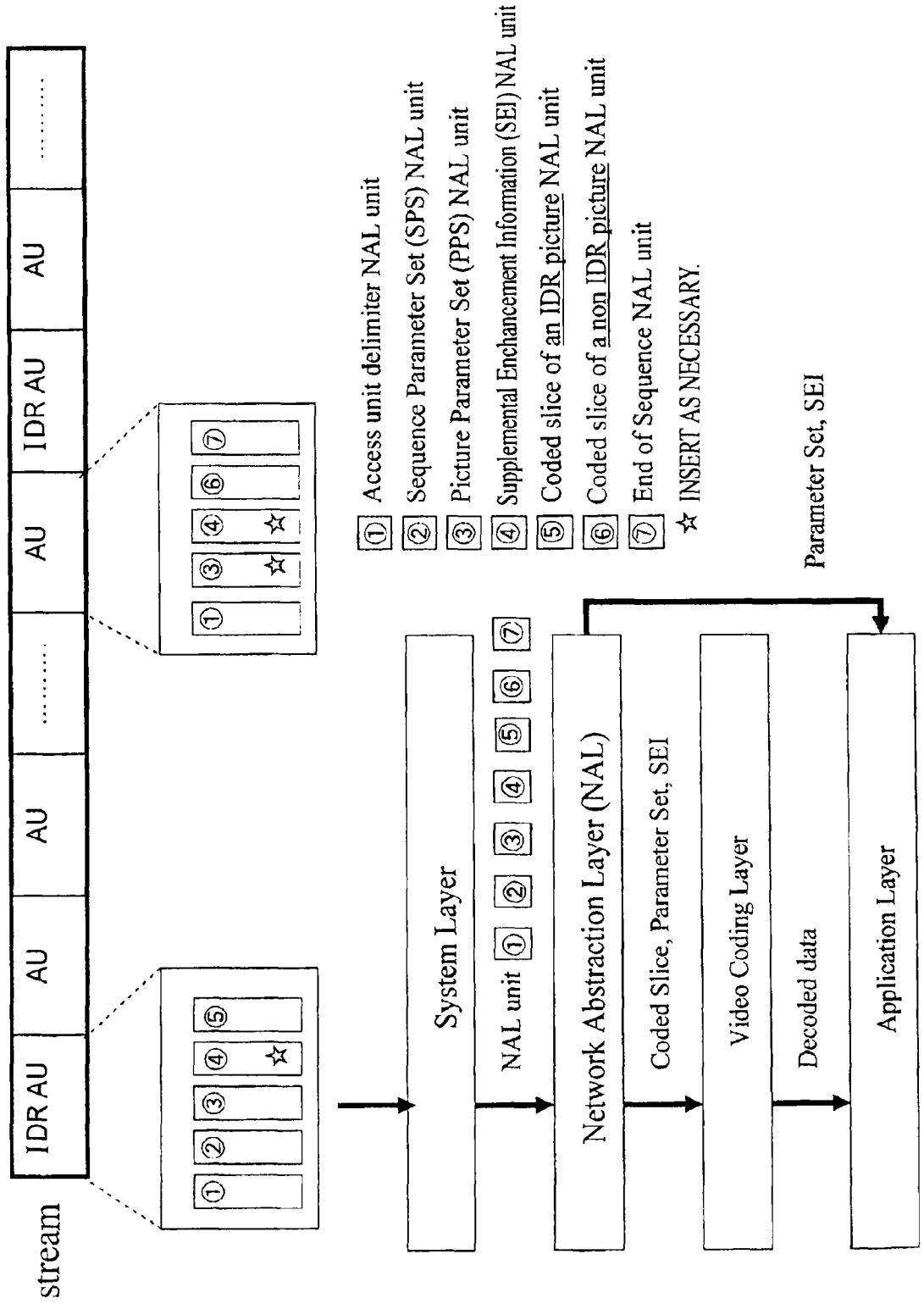

FIG. 5

| Byte | 7 | 6 | 5 | 4 | 3 | 2 | 1 | 0 |
|---|---|---|---|---|---|---|---|---|
| 0 | RESERVED AREA | | | COLOR PRECISION INFORMATION | | COLOR SPACE INFORMATION | | |
| 1 | MAXIMUM VALUE OF COLOR GAMUT OF RED | | | | | | | |
| 2 | MINIMUM VALUE OF COLOR GAMUT OF RED | | | | | | | |
| 3 | MAXIMUM VALUE OF COLOR GAMUT OF GREEN | | | | | | | |
| 4 | MINIMUM VALUE OF COLOR GAMUT OF GREEN | | | | | | | |
| 5 | MAXIMUM VALUE OF COLOR GAMUT OF BLUE | | | | | | | |
| 6 | MINIMUM VALUE OF COLOR GAMUT OF BLUE | | | | | | | |

FIG. 6

| Byte | 7 | 6 | 5 | 4 | 3 | 2 | 1 | 0 |
|---|---|---|---|---|---|---|---|---|
| 0 | DATA SIZE | | | COLOR PRECISION INFORMATION | | COLOR SPACE INFORMATION | | |
| 1 | MAXIMUM VALUE OF COLOR GAMUT OF RED | | | | | | | |
| 2 | MAXIMUM VALUE OF COLOR GAMUT OF GREEN | | | | | | | |
| 3 | MAXIMUM VALUE OF COLOR GAMUT OF BLUE | | | | | | | |
| 4 | MINIMUM VALUE OF COLOR GAMUT OF RED | | | | | | | |
| 5 | MINIMUM VALUE OF COLOR GAMUT OF GREEN | | | | | | | |
| 6 | MINIMUM VALUE OF COLOR GAMUT OF BLUE | | | | | | | |

FIG. 7

| Byte | 7 | 6 | 5 | 4 | 3 | 2 | 1 | 0 |
|---|---|---|---|---|---|---|---|---|
| 0 | VERSION INFORMATION | | | DATA SIZE | | DATA IDENTIFIER | | |
| 1 | COLOR SPACE INFORMATION | | | COLOR PRECISION INFORMATION | | RESERVED AREA | | |
| 2 | MAXIMUM VALUE OF COLOR GAMUT OF RED | | | | MINIMUM VALUE OF COLOR GAMUT OF RED | | | |
| 3 | MAXIMUM VALUE OF COLOR GAMUT OF GREEN | | | | MINIMUM VALUE OF COLOR GAMUT OF GREEN | | | |
| 4 | MAXIMUM VALUE OF COLOR GAMUT OF BLUE | | | | MINIMUM VALUE OF COLOR GAMUT OF BLUE | | | |

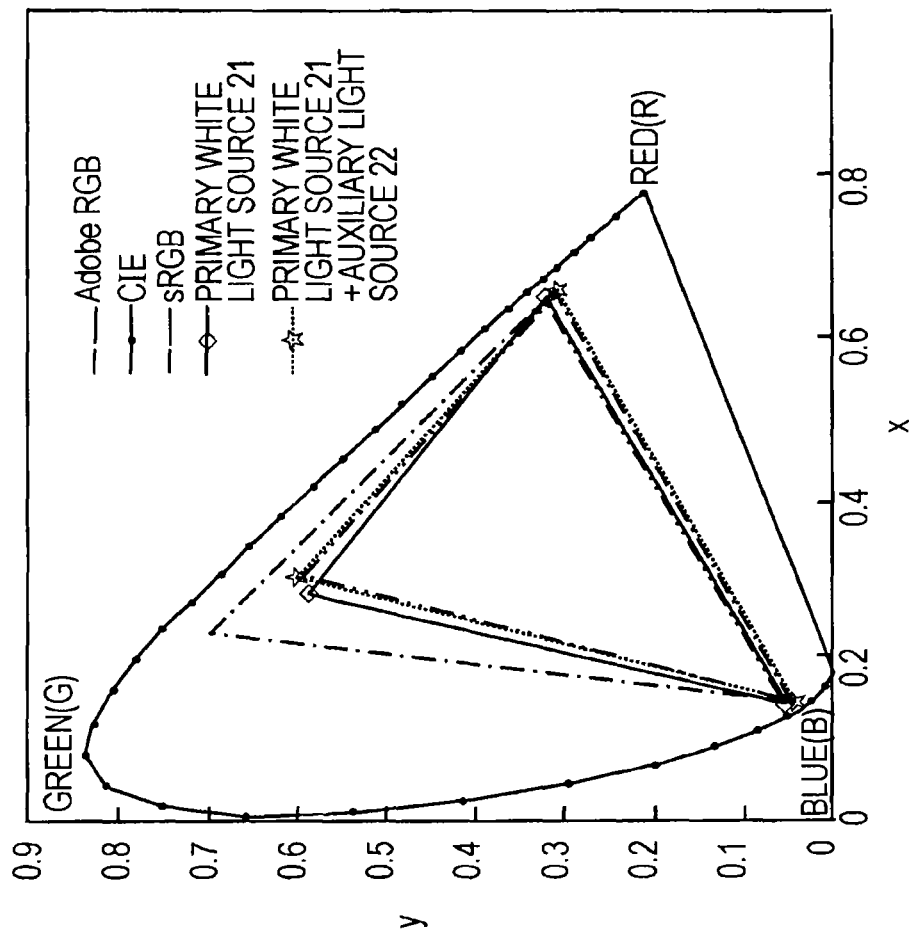

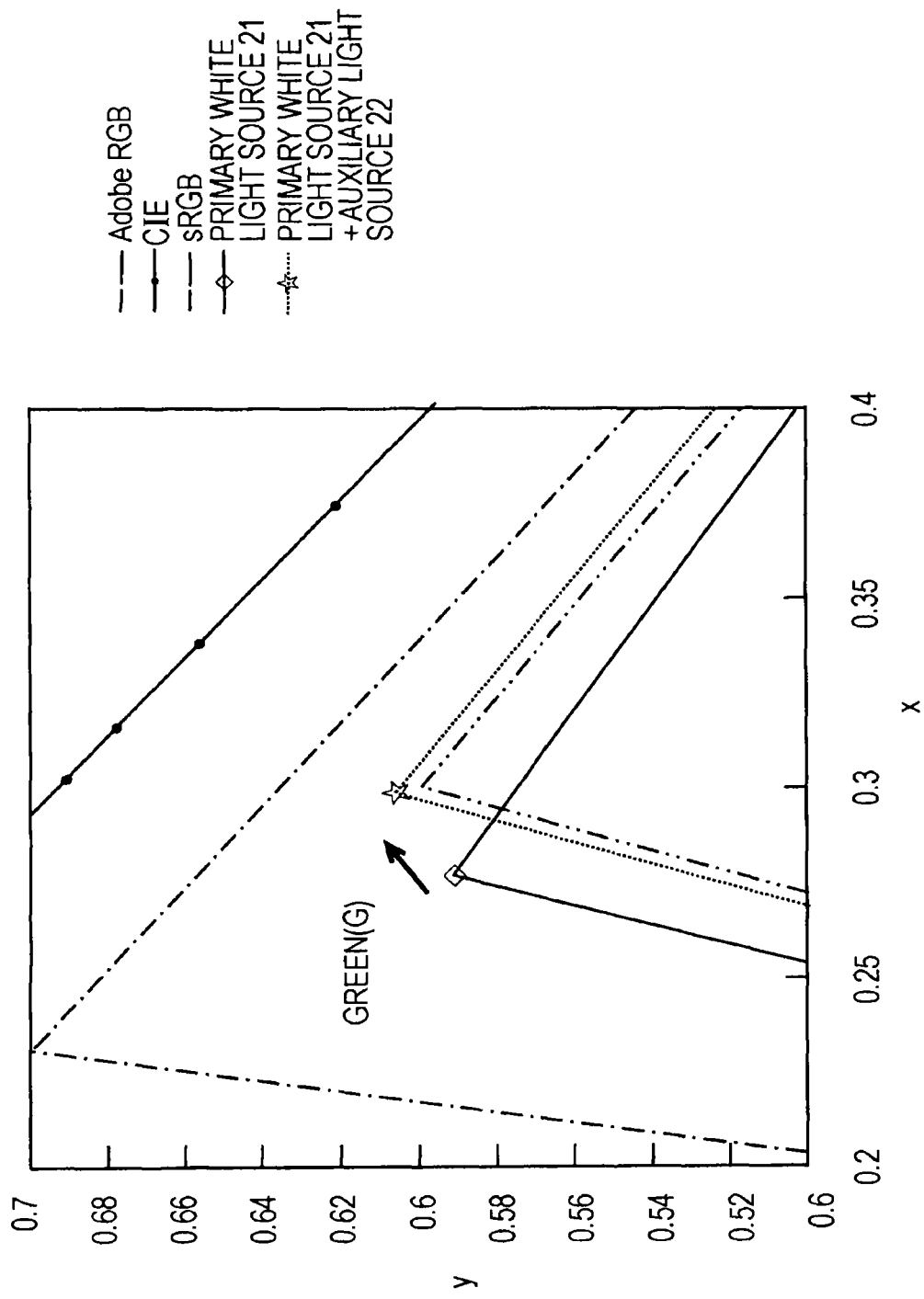

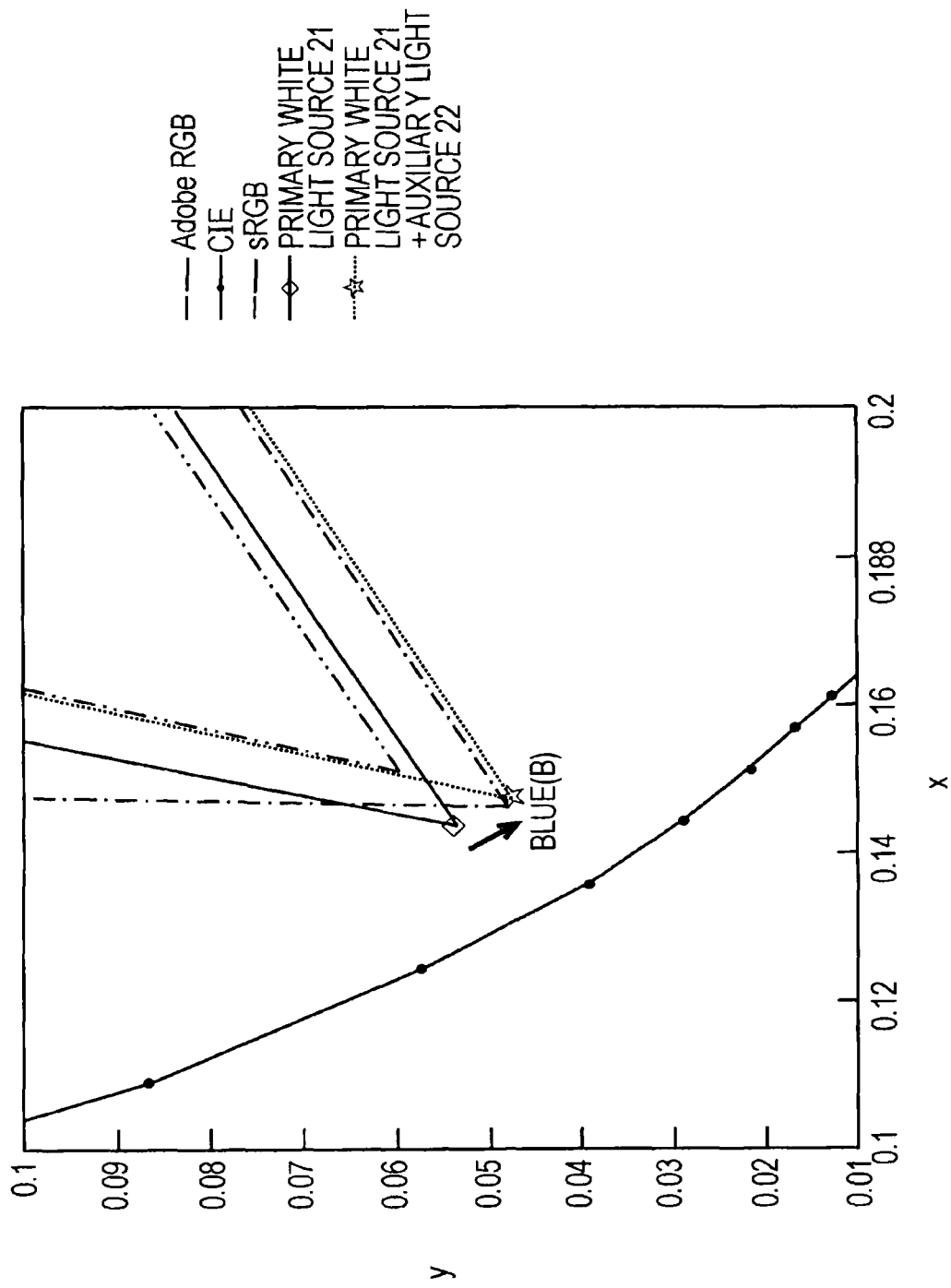

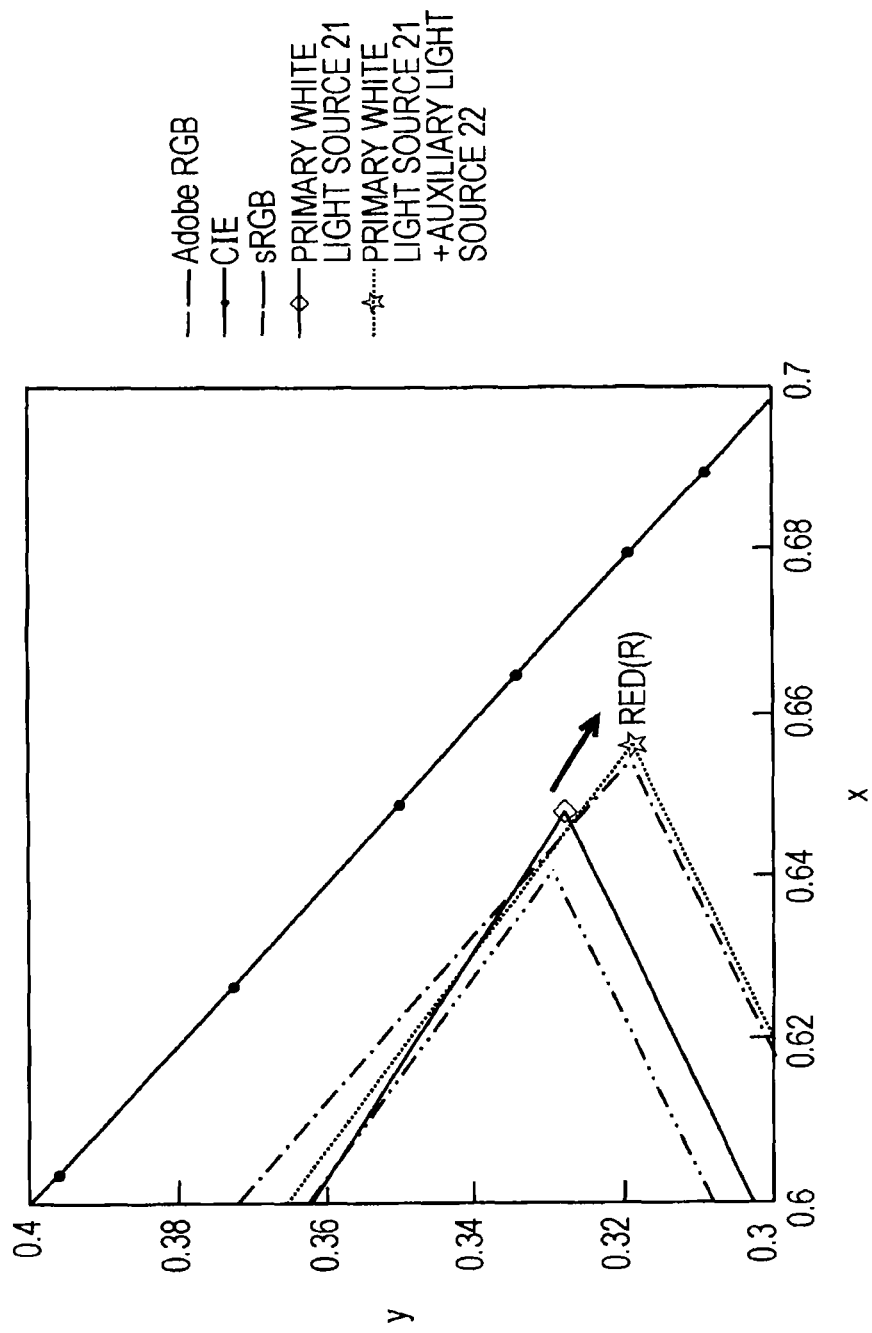

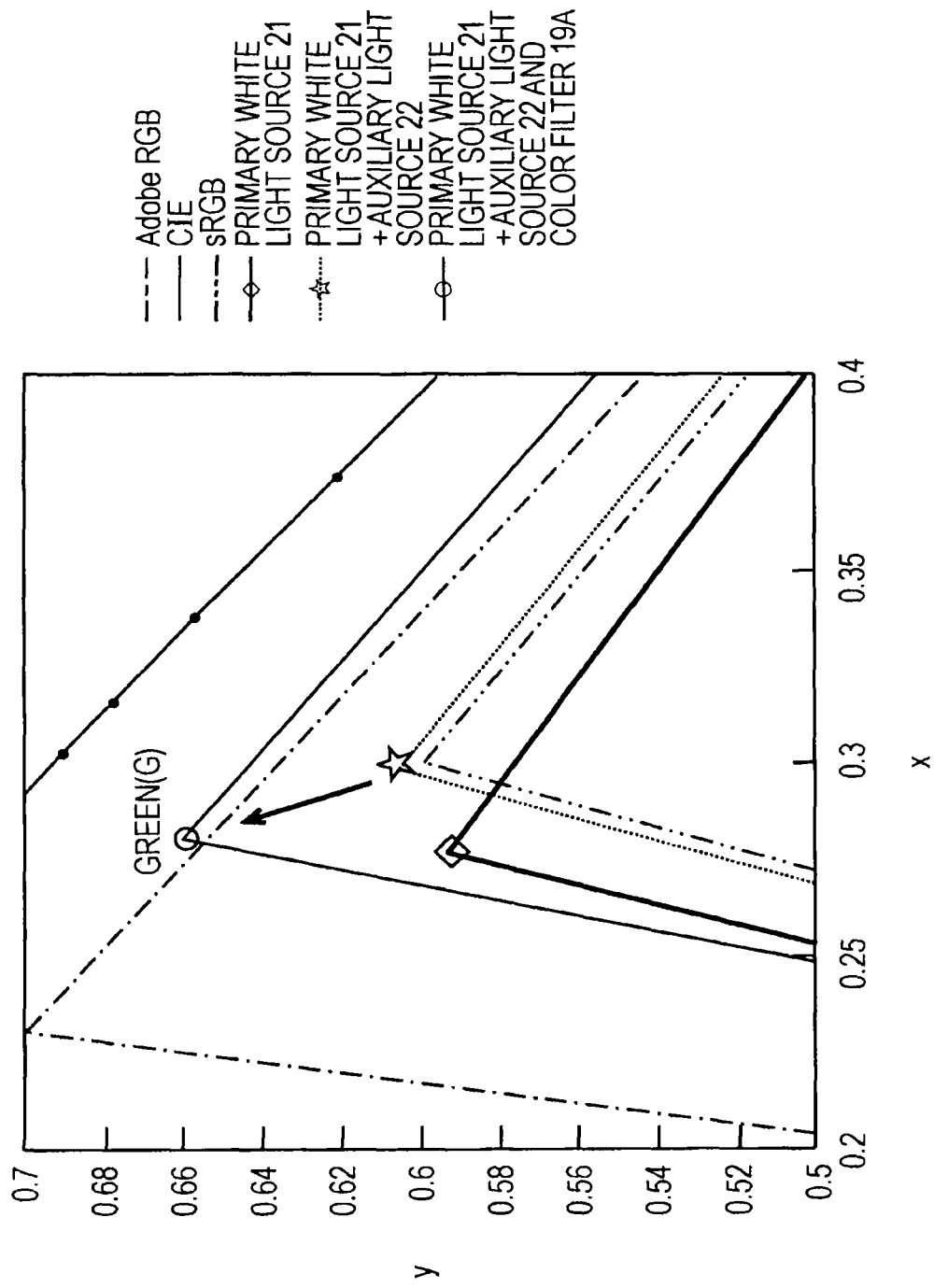

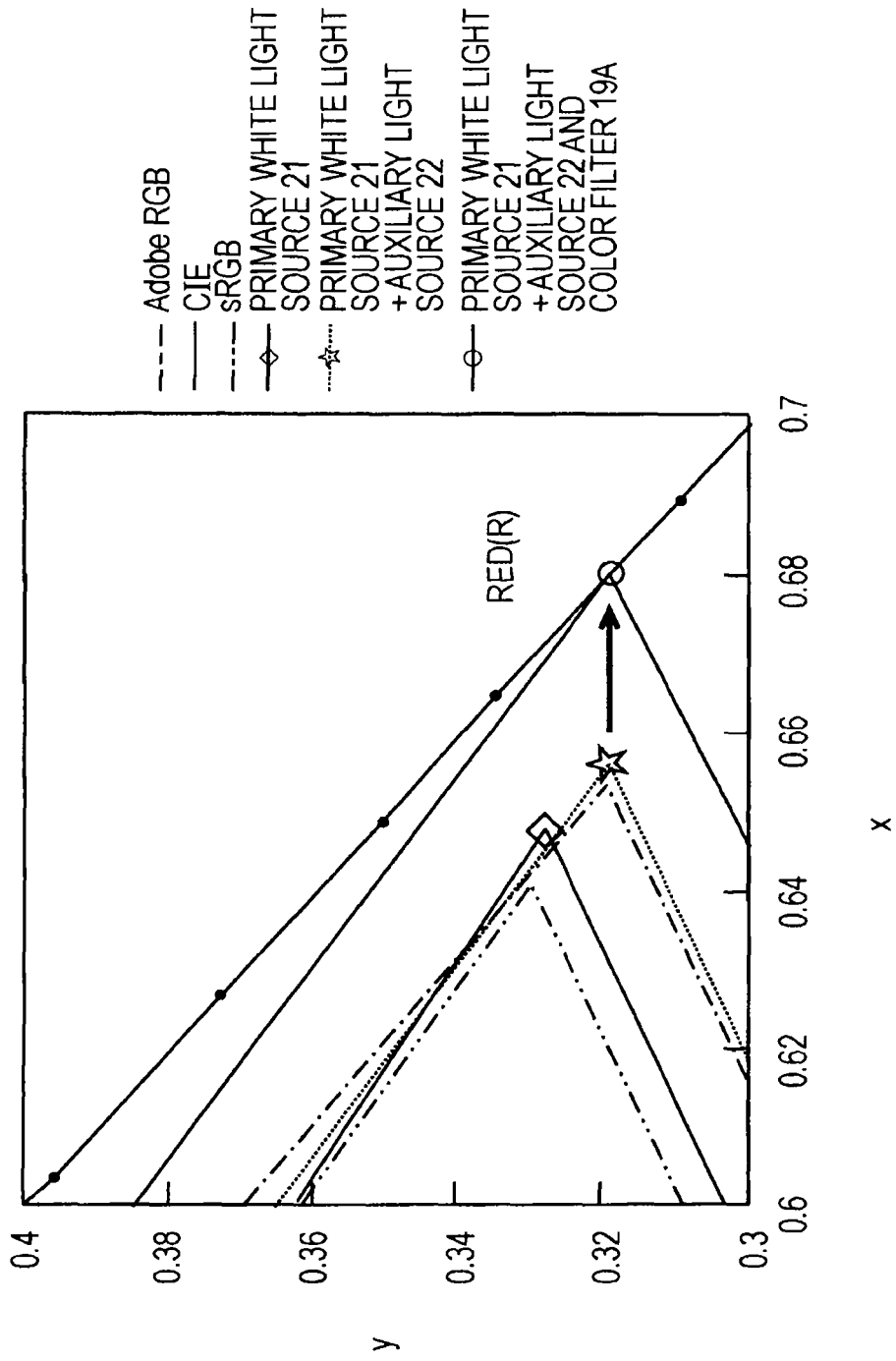

RECORDING APPARATUS, RECORDING METHOD, IMAGE PICKUP APPARATUS, REPRODUCING APPARATUS AND VIDEO SYSTEM

CROSS REFERENCE TO RELATED APPLICATIONS

This application is a continuation application of U.S. application Ser. No. 12/281,339 filed Sep. 2, 2008, which is a National Phase of PCT/JP07/71655 filed Nov. 7, 2007 and claims priority to Japanese Patent Application No. 2006-321178 filed Nov. 29, 2006. The entire contents of each of which are incorporated herein by reference.

TECHNICAL FIELD

The present invention relates to a recording apparatus, a recording method, an imaging apparatus, a reproducing apparatus, and a video system in which a captured video signal is recorded on a recording medium. More specifically, the present invention relates to a recording apparatus etc., in which when a video signal corresponding to a predetermined color space, which is obtained by processing a captured video signal, is recorded on a recording medium, a color space identifier including information indicating the predetermined color space is generated and this color space identifier is recorded on the recording medium in association with the video signal to record the video signal on the recording medium so that a reproducing apparatus can faithfully reproduce an original color of the recorded video signal.

BACKGROUND ART

Recently, there has been increasing demand for high image quality and high color reproducibility, i.e., faithful reproduction of colors existing in nature, for recording and reproducing captured video signals, for example, representation of deep crimson, which is the color of rose petals, the vivid emerald green color of ocean waters, and the like in more natural looking images.

Currently, sRGB standard is the industry standard color space which is standard for computer displays. However, due to the demand for color reproducibility described above, for example, reproducing apparatuses capable of reproducing a color image using an extended sRGB standard (referred to herein as "extended sRGB standard") that defines a wider color space than a color space defined in the sRGB standard have been proposed.

For example, Patent Document 1 describes a color liquid crystal display apparatus implementing an extended sRGB standard. This color liquid crystal display apparatus uses, as light sources of a backlight device, a primary white light source having three wavelength fluorescent lamp that emits light with three or more wavelengths, and an auxiliary light source including at least one or more of a red light emitting diode that emits red light with a peak wavelength $\lambda pr$ set to $\lambda pr = 645$ nm, a green light emitting diode that emits green light with a peak wavelength $\lambda pg$ set to $\lambda pg = 555$ nm, and a blue light emitting diodes that emits blue light with a peak wavelength $\lambda pb$ set to $\lambda pb = 440$ nm to implement a wider color space than the color space defined in the sRGB standard.

For example, in case of using a primary white light source 21 and, as an auxiliary light source 22, a green light emitting diode 22G having a peak wavelength $\lambda pg = 555$ nm, a blue light emitting diode 22B having a peak wavelength $\lambda pb = 440$ nm, and a red light emitting diode 22R having a peak wavelength $\lambda pr = 645$ nm, display light emitted from a color liquid crystal display panel is measured using a colorimeter, and chromaticity points are plotted in an xy chromaticity diagram. Then, a color reproduction range shown in FIG. 17a is obtained.

FIGS. 17b, 17c, and 17d are diagrams showing green (G), blue (B), and red (R) regions to an enlarged scale, respectively. Note that the xy chromaticity diagrams of FIGS. 17a, 17b, 17c, and 17d also show the color reproduction range of the Adobe RGB standard, the XYZ colorimetric system defined by the International Commission on Illumination (CIE), the color reproduction range of the sRGB standard, and the color reproduction range in the case of using only the primary white light source 21 as a light source.

Furthermore, for example, Patent Document 1 further describes that a color filter including a red filter having a peak wavelength Fpr of a transmission wavelength range, satisfying $685 \text{ nm} \leq Fpr \leq 690 \text{ nm}$, and having a transmittance of zero for a transmission wavelength range of a blue filter, a green filter having a peak wavelength Fpg of a transmission wavelength range, equal to 530 nm, and having a half-width Fhwg of the transmission wavelength range, satisfying $90 \text{ nm} \leq Fhwg \leq 100 \text{ nm}$, as a result of reducing the transmittance of the green color filter for the transmission wavelength range of the blue filter, and a blue filter having a peak wavelength Fpb of a transmission wavelength range, satisfying $440 \text{ nm} \leq Fpb \leq 460 \text{ nm}$, is provided to enable significant increase in the color reproduction range.

For example, in a case where the primary white light source 21 and the auxiliary light source 22 are used and a color filter 19A including a blue filter having a peak wavelength Fpb=440 nm, a green filter having a peak wavelength Fpg=530 nm, and a red filter having a peak wavelength Fpr=690 nm and having a half-width Fhwg=90 nm of the transmission wavelength range of green light is provided, display light emitted from a color liquid crystal display panel is measured using a colorimeter, and chromaticity points are plotted in an xy chromaticity diagram. Then, a color reproduction range shown in FIG. 18a is obtained.

FIGS. 18b, 18c, and 18d are diagrams showing green (G), blue (B), and red (R) regions to an enlarged scale, respectively. Note that the xy chromaticity diagrams of FIGS. 18a, 18b, 18c, and 18d also show the color reproduction range of the Adobe RGB standard, the XYZ colorimetric system defined by the International Commission on Illumination (CIE), the color reproduction range of the sRGB standard, and the color reproduction range in the case of using only the primary white light source 21 as a light source.

Meanwhile, a demand for recording a video signal in a wider color space than a sRGB color space has also increased for recording apparatuses. In existing cases where a recording apparatus and a reproducing apparatus are compatible with the sRGB standard, the reproducing apparatus can faithfully reproduce a color of a video signal recorded by the recording apparatus.

In a case where a recording apparatus records a video signal in a wider color space than a sRGB color space and a reproducing apparatus supports only an existing sRGB color space, however, the reproducing apparatus reproduces the video signal by merely clipping it in a color space thereof, which does not enable reproduction of an original color of the video signal.

Further, like Patent Document 1, also in a case where a color image can be reproduced using the extended sRGB standard, if a video signal recorded by a recording apparatus has also been recorded using the extended sRGB standard, a reproducing apparatus will not be able to faithfully reproduce the color of the video signal unless it is possible to determine whether the video signal complies with the sRGB standard or the extended sRGB standard.

Note that Patent Document 2 describes an image reproducing apparatus that reproduces an image on the basis of an image set in which image data and color space identification information indicating a color space related to the image data are associated with each other. This image reproducing apparatus performs image reproduction tailored to individual cases where a color space specified by the color space identification information is a standard color space and a specific color space.

That is, in case of reproducing image data for which the color space specified by the color space identification information is a standard color space (e.g., the sRGB color space), the image reproducing apparatus performs basic color space conversion on the image data to generate reproduction image data. In case of reproducing image data for which the color space specified by the color space identification information is a color space other than the standard color space (e.g., the Adobe RGB (trademark of Adobe Systems Incorporated) color space or the like), on the other hand, the image reproducing apparatus performs device-dependent color space (e.g., sRGB color space or the like) conversion on the image data to generate reproduction image data.

Patent Document 1: Japanese Unexamined Patent Application Publication No. 2006-119295

Patent Document 2: Japanese Unexamined Patent Application Publication (Domestic Republication of PCT International Publication) No. 2004/077837

DISCLOSURE OF INVENTION

Technical Problem

Patent Document 2 provides image reproduction suitable for image data based on color space information associated with the image data. The technique described in Patent Document 2 is based on the existence of an image data set (image data file) in which image data and color space identification information indicating a color space related to the image data are associated with each other, and a problem arises as to how to obtain the image data set. Patent Document 2 describes that the image data set is generated using a digital camera, but gives no specific description of what procedures are to be used in a recording system of the digital camera to generate the image data set.

Furthermore, the image data set in Patent Document 2 has a structure in which a piece of color space identification information is added to predetermined image data. Thus, for example, in a case where a video signal including a plurality of frames of image data is handled, the complexity of handling the color space identification information is increased at the time of editing such as splitting and merging. For example, at the time of splitting of the video signal, it is necessary to copy and add color space information to the split portions. Furthermore, for example, at the time of merging, if color spaces of merged video signals differ from each other, it is necessary to select any piece of color space information.

It is an object of the present invention to provide a recording apparatus and a recording method in which a video signal is recorded on a recording medium so that a reproducing apparatus can faithfully reproduce an original color of the recorded video signal.

Technical Solution

A concept of the present invention provides a recording apparatus characterized by including:

a video signal processing unit that processes a captured video signal to obtain a video signal corresponding to a predetermined color space;

a color space identifier generating unit that generates a color space identifier including information indicating the predetermined color space; and a recording unit that records the video signal obtained by the video signal processing unit and the color space identifier generated by the color space identifier generating unit in association on a recording medium, wherein the video signal is recorded on the recording medium in a form of a video stream including a plurality of access units, and the color space identifier is associated with the predetermined access unit.

In the present invention, in the video signal processing unit, a captured video signal is processed and a video signal corresponding to a predetermined color space is obtained. For example, in a color space selecting unit, a predetermined color space is selected from among a plurality of color spaces. This selection is performed according to, for example, the user's specification operation. Examples of the color spaces include a sRGB color space and an extended sRGB space. For example, if a sRGB color space is selected as the color space, a video signal corresponding to the sRGB color space is obtained, and if an extended sRGB color space is selected as the color space, a video signal corresponding to the extended sRGB space is obtained.

In the color space identifier generating unit, a color space identifier including information indicating the predetermined color space is generated. Subsequently, in the recording unit, the video signal obtained by the video signal processing unit and the color space identifier generated by the color space identifier generating unit are recorded in association on a recording medium. In this case, the video signal is recorded on the recording medium in a form of a video stream including a plurality of access units, and the color space identifier is associated with a predetermined access unit.

In the present invention, video signal processing is performed so that a video signal corresponding to a predetermined color space can be obtained, and a color space identifier including information indicating the predetermined color space is generated. The video signal and the color space identifier are recorded in association on a recording medium. Thus, a reproducing apparatus that reproduces a color image based on the video signal recorded on the recording medium can use color space information included in the color space identifier recorded in association with the video signal to utilize the video signal in a state suitable for the reproducing apparatus and can faithfully reproduce an original color of the video signal.

Furthermore, a color space identifier exists in correspondence with a predetermined access unit of a video stream (a predetermined position of a video signal). Thus, compared with that described in Patent Document 2 noted above, it is not necessary to copy a color space identifier and add it to split portions at the time of split editing. Further, at the time of merge editing, color space identifiers added to video signals are used without changing them. Thus, no problem occurs even in a case where data in which video signals having different color spaces are merged is reproduced using a television receiver or the like or any other case. This results in an improvement in editing performance such as improved splitting and merging.

In the present invention, the color space identifier generated by the color space identifier generating unit may include, together with information indicating a color space, information regarding a color gamut of the video signal (e.g., the maximum and minimum values of the color gamut). In a case where the color space identifier includes information regarding a color gamut of the video signal, a reproducing apparatus can use the information regarding a color gamut without performing processing of obtaining the information regarding a color gamut from the video signal.

Furthermore, in the present invention, the color space identifier generating unit may include a storage unit having stored therein the information regarding a color gamut of the video signal, and may be configured to read and obtain the information regarding a color gamut of the video signal included in the color space identifier from the storage unit. The color space identifier generating unit may omit processing of determining the information regarding a color gamut from the video signal.

In the present invention, in the recording unit, the video signal obtained by the video signal processing unit is subjected to predetermined data compression processing for obtaining a stream configuration having a plurality of consecutive access units in the video signal, and is recorded. In the color space identifier generating unit, a color space identifier is generated in correspondence with each of the access units constituting the stream of the video signal after the data compression processing is performed. In this case, for example, information regarding the color gamut can be stored in every access unit, resulting in improved precision of color reproducibility in a reproducing apparatus.

In the present invention, in the recording unit, the video signal obtained by the video signal processing unit is subjected to predetermined data compression processing for obtaining a stream configuration having a plurality of consecutive access units in the video signal, and is recorded. In the color space identifier generating unit, color space identifiers are generated in correspondence with predetermined intermittently arranged access units among the access units constituting the stream of the video signal after the data compression processing is performed. In a case where color space identifiers are generated in correspondence with intermittently arranged access units, redundancy can be reduced.

In the present invention, in the recording unit, the video signal obtained by the video signal processing unit is subjected to predetermined data compression processing for obtaining a stream configuration having a plurality of consecutive access units in the video signal and achieving a structure in which every sequence including a predetermined number of access units has a sequence parameter set including color information for the sequence, and is recorded. In the color space identifier generating unit, a color space identifier is generated in correspondence with an access unit including the sequence parameter set among the access units constituting the stream of the video signal after the data compression processing is performed.

In a case where data compression processing in accordance with the MPEG4-AVC standard is performed, the access unit including the sequence parameter set is an access unit including a NAL unit of the sequence parameter set. In this case, by reading the access unit including the sequence parameter set, the sequence parameter set and the color space identifier, i.e., relevant color information, can be collectively read. The required information access time in a reproducing apparatus can be reduced.

In the present invention, in the color space identifier generating unit, when the color space selecting unit selects a specific color space, no color space identifier may be generated. For example, in the color space identifier generating unit, when a sRGB color space is selected, a color space identifier is not generated, and when an extended RGB color space is selected, a color space identifier is generated. In this case, the compatibility with an existing product on which a video signal is recorded in a specific color space (on which no color space identifier is recorded) is maintained. In the technique described in Patent Document 2 noted above, color space identification information is added for any color space, and the compatibility with an existing product on which no color space identification information is added is not maintained.

In the present invention, the video signal and color space identifier recorded on the recording medium are reproduced from the recording medium and are sent to a network via a network interface. For example, in the color space identifier generating unit, a color space identifier is generated in a form compatible with the output format of the network interface. In this case, it is not necessary to change the form of the color space identifier recorded on the recording medium when the color space identifier is sent to a network, and the color space identifier can be sent to the network with the form thereof unchanged. In the technique described in Patent Document 2 noted above, color space identification information is not generated in a form compatible with the output format of the network interface, and a conversion block is necessary for conversion into a form compatible with the output format of the network interface when the color space identification information is sent to the network.

In the present invention, the video signal and color space identifier recorded on the recording medium are reproduced by a reproducing unit in a case where, for example, they are sent to a network. In this case, the color space of the video signal to be reproduced may be displayed on a display unit on the basis of the color space identifier. In this case, a user can easily understand the color space of the video signal to be reproduced.

Advantageous Effects

According to the present invention, when a video signal corresponding to a predetermined color space that is obtained by processing a captured video signal is recorded on a recording medium, a color space identifier including information indicating the predetermined color space is generated and is recorded in association with the video signal. The video signal can be recorded on the recording medium so that a reproducing apparatus can faithfully reproduce an original color of the recorded video signal.

BRIEF DESCRIPTION OF DRAWINGS

FIG. 3 is a diagram showing a color array of a four-color color filter provided on a front surface of an imaging element.

FIG. 4A is a diagram explaining an overview of the MPEG4-AVC standard.

FIG. 5 is a diagram showing an example construction of a color space identifier including information indicating a color space, etc.

FIG. 6 is a diagram showing a construction of a color space identifier for a network interface A.

FIG. 7 is a diagram showing a construction of a color space identifier for a network interface B.

FIG. 17a is a diagram showing a color reproduction range in a case where an auxiliary light source is used in addition to a primary white light source.

FIG. 17b is a diagram showing the color gamut of a green (G) region shown in FIG. 17a to an enlarged scale.

FIG. 17c is a diagram showing the color gamut of a blue (B) region shown in FIG. 17a to an enlarged scale.

FIG. 17d is a diagram showing the color gamut of a red (R) region shown in FIG. 17a to an enlarged scale.

FIG. 18b is a diagram showing the color gamut of a green (G) region shown in FIG. 18a to an enlarged scale.

FIG. 18d is a diagram showing the color gamut of a red (R) region shown in FIG. 18a to an enlarged scale.

EXPLANATION OF REFERENCE NUMERALS

100 imaging apparatus, 110 camera unit, 111 lens block, 112 imaging element, 113 pre-processing circuit, 114 optical-block driver, 115 imaging-element driver, 116 timing generation circuit, 120 control unit, 121 CPU, 122 RAM, 123 flash ROM, 124 clock circuit, 125 system bus, 131 signal processing unit, 132 encoding/decoding unit, 133 SDRAM, 134 media interface, 135 recording medium, 136 operation unit, 137 LCD controller, 138 LCD, 139 external interface, 151 offset correction processing unit, 152 white-balance correction processing unit, 153 vertical synchronization processing unit, 154 processing unit, 155 linear matrix processing unit, 156R to 156B gamma correction processing unit, 157 luminance signal generation processing unit, 158 color-difference signal generation processing unit, 159 band limiting/decimation processing unit, 200 video system, 201 camera, 202 player, 202a reproducing unit, 203 television receiver, 204 network

BEST MODES FOR CARRYING OUT THE INVENTION

Figure 1:
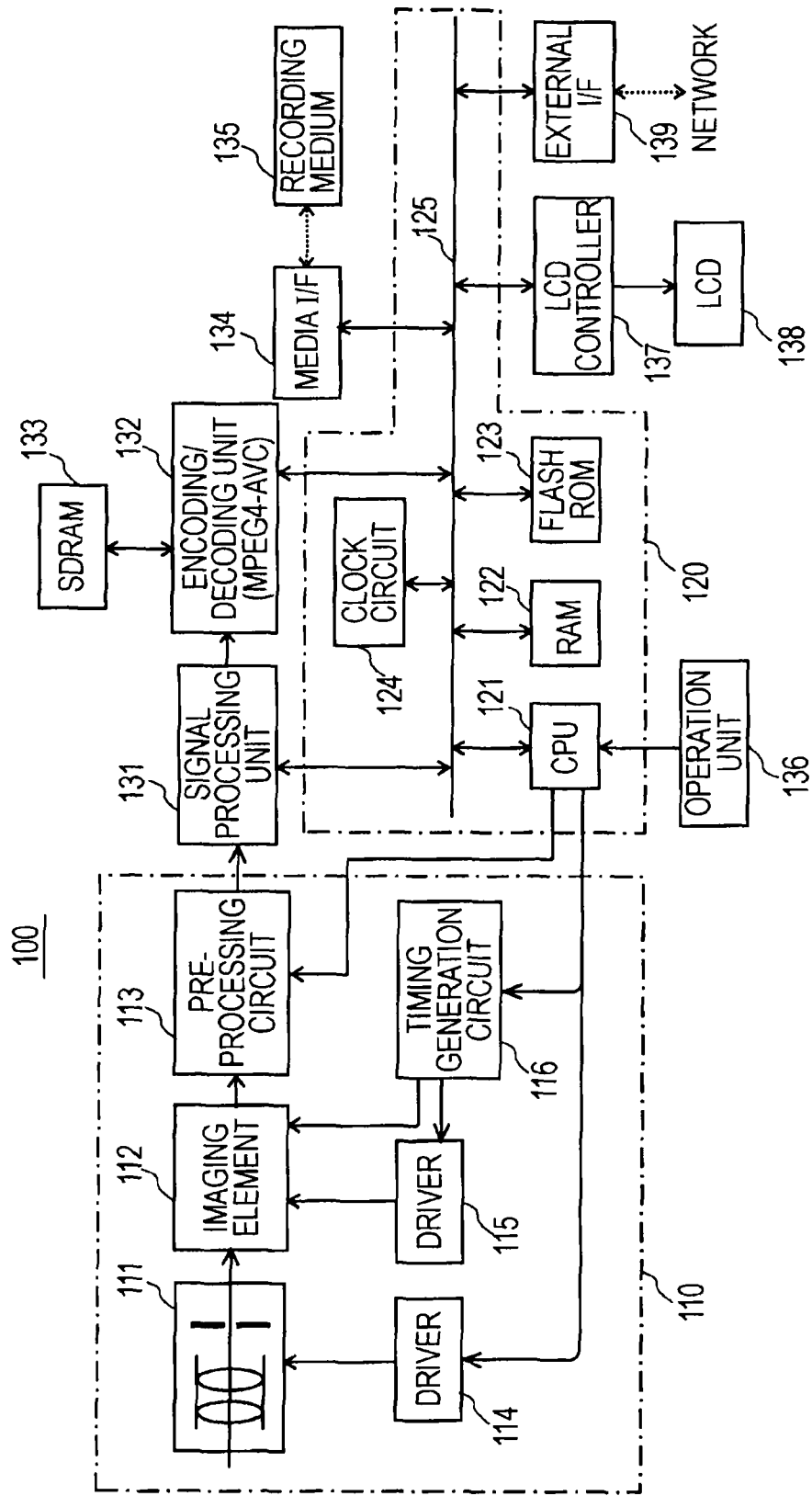
FIG. 1 is a block diagram showing a structure of an imaging apparatus according to an embodiment.

Embodiments of the present invention will now be described with reference to the drawings. FIG. 1 shows a structure of an imaging apparatus 100 according to an embodiment.

The imaging apparatus 100 includes a camera unit 110, a control unit 120, a signal processing unit 131, an encoding/decoding unit 132, an SDRAM (Synchronous Dynamic Random Access Memory) 133, a media interface (media I/F) 134, an operation unit 136, an LCD (Liquid Crystal Display) controller 137, an LCD 138, and an external interface (external I/F) 139. A recording medium 135 is attachable to and removable from the media I/F 134.

As the recording medium 135, a semiconductor memory such as a memory card, an optical recording medium such as a recordable DVD (Digital Versatile Disk) or a recordable CD (Compact Disc), a magnetic disk, or the like may be used. In this embodiment, for example, a memory card is used as the recording medium 135.

The camera unit 110 includes an optical block 111, an imaging element 112, a pre-processing circuit 113, an optical-block driver 114, an imaging-element driver 115, and a timing control circuit 116.

The optical block 111 has an imaging lens, a focus mechanism, a shutter mechanism, an aperture (iris) mechanism, and so forth. The optical-block driver 114 forms a drive signal for activating the optical block 111 under control of the control unit 120, and supplies the drive signal to the optical block 111. In the optical block 111, the focus mechanism, the shutter mechanism, and the aperture mechanism are controlled in response to drive signals from the driver 114.

The imaging element 112 is an imaging element such as a CCD (Charged Coupled Device) or CMOS (Complementary Metal-Oxide Semiconductor) imaging element. The timing generation circuit 116 generates various timing signals necessary for the imaging element 112 and the imaging-element driver 115 under control of the control unit 120. The driver 115 forms a drive signal for activating the imaging element 112 on the basis of a timing signal from the timing generation circuit 116, and supplies the drive signal to the imaging element 112.

The pre-processing circuit 113 includes, for example, a CDS (Correlated Double Sampling), an AGC (Automatic Gain Control), an AD (Analog to Digital) converter, etc. The pre-processing circuit 113 performs predetermined signal processing, such as noise elimination, automatic gain control, and A/D conversion, on an analog imaging signal output from the imaging element 112, and outputs digital video data (camera output data).

The control unit 120 is a microcomputer including a CPU (Central Processing Unit) 121, an RAM (Random Access Memory) 122, a flash ROM (Read Only Memory) 123, and a clock circuit 124, which are connected via a system bus 125. The control unit 120 controls the operation of the elements of the imaging apparatus 100. Here, the RAM 122 is used mainly as a work area such as used for temporarily storing intermediate results of processing. The flash ROM 123 stores various programs executed by the CPU 121, data necessary for processing, etc. The clock circuit 124 provides the current year, month, and day, the current day of the week, and the current time.

The operation unit 136 constitutes a user interface, and receives a user's operation. This operation unit 136 includes a touch panel, control keys, etc. The operation unit 136 is connected to the CPU 121, and supplies an operation signal corresponding to the user's operation to the CPU 121.

A user can operate the operation unit 136 to specify either a sRGB color space or an extended sRGB color space as a color space of a video signal to be recorded. When the user specifies a sRGB color space, the control unit 120 (CPU 121) selects the sRGB color space as the color space of the video signal to be recorded. When the user specifies an extended sRGB color space, on the other hand, the control unit 120 (CPU 121) selects the extended sRGB color space as the color space of the video signal to be recorded. In this sense, the control unit 120 constitutes a color space selecting unit.

The signal processing unit 131 performs interpolation processing, filtering processing, matrix operation processing, luminance signal generation processing, color-difference signal generation processing, etc., on the digital video data (camera output data) output from the pre-processing circuit 113 of the camera unit 110, and outputs a luminance signal Y and a color-difference signal Cr/Cb of a captured video signal.

Figure 2:
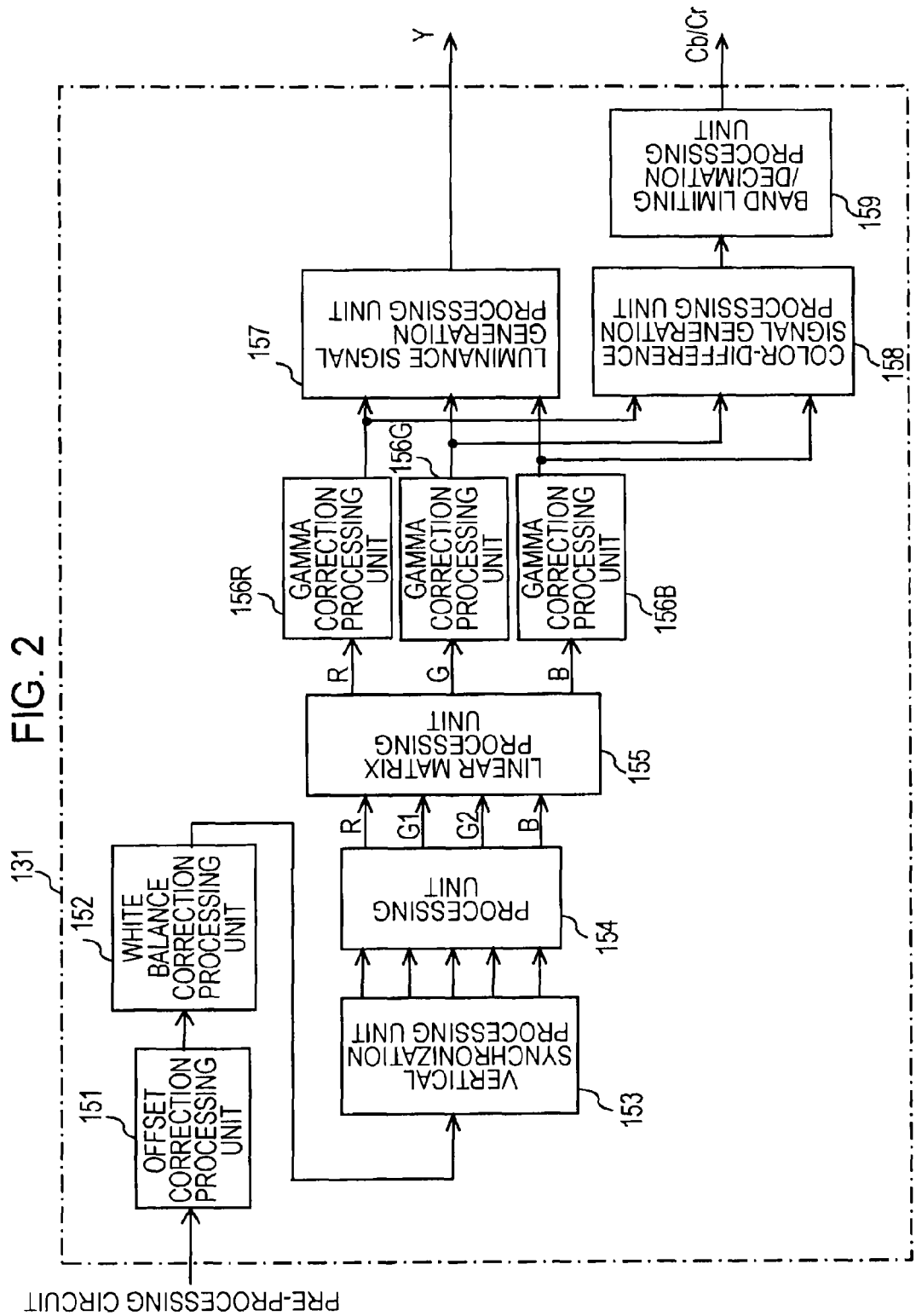
FIG. 2 is a block diagram showing a structure of a signal processing unit in the imaging apparatus.
Figure 3:
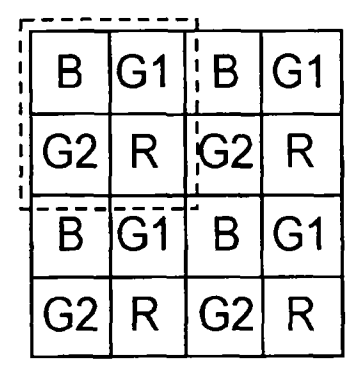

FIG. 2 shows an example structure of the signal processing unit 131. This example structure is an example in which a four-color color filter having a color array shown in FIG. 3 is provided on a front surface of the imaging element 112. This color filter has a structure in which a total of four filters, namely, an R filter that allows only red (R) light to pass therethrough, a B filter that allows only blue (B) light to pass therethrough, a G1 filter that allows only green light having a first wavelength range to pass therethrough, and a G2 filter that allows only green light having a second wavelength range to pass therethrough, are used as a minimum unit.

In a case where a color filter having the color array shown in FIG. 3 is provided on the front surface of the imaging element 112, the analog imaging signal output from the imaging element 112, described above, includes four color signals, i.e., an R signal, a G1 signal, a G2 signal, and a B signal. Subsequently, in the pre-processing circuit 113, predetermined signal processing, such as noise elimination, automatic gain control, and A/D conversion, is performed on the color signals. As the digital video data described above, four color signals, i.e., an R signal, a G1 signal, G2 signal, and a B signal, are supplied from the pre-processing circuit 113 to the signal processing unit 131.

The signal processing unit 131 has an LSI (Large Scale Integrated Circuit) structure, and includes an offset correction processing unit 151, a white balance correction processing unit 152, a vertical synchronization processing unit 153, a processing unit 154, a linear matrix processing unit 155, gamma correction processing units 156R to 156B, a luminance signal generation processing unit 157, a color-difference signal generation processing unit 158, and a band limiting/decimation processing unit 159.

The offset correction processing unit 151 eliminates a noise component (offset component) contained in the color signals supplied from the pre-processing circuit 113. The white balance correction processing unit 152 performs white balance correction on the color signals from which the noise component has been eliminated by the offset correction processing unit 151. That is, the white balance correction processing unit 152 corrects for unbalance between the colors due to the difference in object's color temperature environment and the difference in sensitivity of the color filter (R, G1, G2, and B) provided on the front surface of the imaging element 112.

The vertical synchronization processing unit 153 performs vertical synchronization processing on the color signals that have been subjected to white balance correction by the white balance correction processing unit 152. The processing unit 154 performs interpolation processing, filtering processing, high-frequency correction processing, noise processing, etc., on the color signals synchronized and obtained by the vertical synchronization processing unit 153. The interpolation processing is processing of interpolating color signals for a block of two by two pixels, which is the minimum unit of the color filter (R, G1, G2, and B), in a phase for the same space. The filtering processing is processing of limiting a signal band. The high-frequency component correction processing is processing of correcting a high-frequency component of the signal band. The noise processing is processing of eliminating a noise component of the color signals.

The linear matrix processing unit 155 performs a four-input, three-output matrix operation on the R signal, G1 signal, G2 signal, and B signal output from the processing unit 154, and outputs an R signal, a G signal, and a B signal. That is, the linear matrix processing unit 155 determines an R signal, a G signal, and a B signal from the R signal, the G1 signal, the G2 signal, and the B signal using a matrix coefficient of a three-by-four matrix.

Here, as described above, in a case where the control unit 120 selects a sRGB color space as the color space of the video signal to be recorded according to the user's specification, the matrix coefficient for the linear matrix processing unit 155 is set so that the target color space of the R signal, G signal, and B signal after the matrix operation becomes the sRGB color space. Similarly, in a case where the control unit 120 selects an extended sRGB color space as the color space of the video signal to be recorded according to the user's specification, the matrix coefficient for the linear matrix processing unit 155 is set so that the target color space of the R signal, G signal, and B signal after the matrix operation becomes the extended sRGB color space.

The gamma correction processing units 156R, 156G, and 156B perform gamma correction on the R signal, G signal, and B signal output from the linear matrix processing unit 155, respectively. In this case, in order to finally achieve a linear characteristic, an inverse correction for a nonlinear characteristic of a display apparatus such as a CRT (Cathode Ray Tube) display or an LCD (Liquid Crystal Display) is performed.

The luminance signal generation processing unit 157 combines the R signal, G signal, and B signal, which have been gamma-corrected by the gamma correction processing units 156R, 156G, and 156B, at a predetermined combination ratio to generate a luminance signal Y. The color-difference signal generation processing unit 158 combines the R signal, G signal, and B signal, which have been gamma-corrected by the gamma correction processing units 156R, 156G, and 156B, at a predetermined combination ratio to generate a blue color-difference signal Cb and a red color-difference signal Cr. The band limiting/decimation processing unit 159 performs band limiting and decimation processing on the color-difference signals Cb and Cr generated by the color-difference signal generation processing unit 158 to generate a color-difference signal Cb/Cr in which the color-difference signals Cb and Cr are time-division multiplexed.

Referring back to FIG. 1, the encoding/decoding unit 132 performs data compression processing on the luminance signal Y and color-difference signal Cb/Cr output from the signal processing unit 131 to generate a compressed video signal. The encoding/decoding unit 132 further performs data expansion processing on a compressed video signal that is reproduced from the recording medium 135 by using the media I/F 134 to generate a luminance signal Y and a color-difference signal Cb/Cr. The encoding/decoding unit 132 uses the SDRAM 133 to perform the data compression processing and data expansion processing described above.

The encoding/decoding unit 132 performs the data compression processing and data expansion processing in accordance with the MPEG4-AVC standard, which is known in the art. The MPEG4-AVC standard will be briefly described with reference to FIG. 4A.

In the MPEG4-AVC standard, a NAL (Network Abstraction Layer) exists between a VCL (Video Coding Layer)

handling moving-image encoding processing and a lower system in which encoded information is transmitted and accumulated. Further, parameter sets corresponding to header information of sequences or pictures are also handled separately from information generated in the VCL. Moreover, the association of a bit stream with a lower system such as an MPEG-2 system is performed in units of "NAL units", each of which is a segment of the NAL.

Major NAL units will be described. An SPS (Sequence Parameter Set) NAL unit includes information concerning encoding of the entire sequence, such as a profile and level information. In a bit stream, a plurality of consecutive access units in which an access unit having the SPS NAL unit inserted therein is present at the beginning constitutes one sequence. In general, the stream is edited, such as split, merged, and deleted, using each sequence as the unit of editing.

A PPS (Picture Parameter Set) NAL unit includes information concerning an encoding mode of the entire picture, such as an entropy encoding mode and a quantization parameter for each picture. Encoded data of an IDR (Instantaneous Decoder Refresh) picture is stored in a "Coded Slice of an IDR picture" NAL unit. The IDR picture is a picture at the beginning of an image sequence and is, in an actual use example, a picture serving as an editing point. Encoded data of other pictures, which are non-IDR pictures, is stored in a "Coded Slice of a non IDR picture" NAL unit.

An SEI (Supplemental Enhancement Information) NAL unit contains additional information, which is not essential for encoding of the VCL. Information convenient for random access, information uniquely defined by a user, etc., are contained. An AUD (Access Unit Delimiter) NAL unit is added to the beginning of an access unit (AU), which will be described later. The AUD NAL unit includes information indicating the type of a slice included in the access unit. Others, including an EOS (End Of Sequence) NAL unit indicating the end of a sequence and an EOS (End Of Stream) NAL unit indicating the end of a stream, are defined.

A collection of some NAL units to access information in a bit stream in units of pictures (in units of frames) is referred to as an access unit (AU). An access unit always includes a NAL unit corresponding to a slice of a picture (the "Coded Slice of an IDR picture" NAL unit or the "Coded Slice of a non IDR picture" NAL unit). In a case where an access unit includes other pieces of information, it is necessary to arrange the pieces of information according to the order shown in the FIG. 4A.

The encoding/decoding unit 132 performs data compression processing so that a color space identifier is included in an access unit including the SPS NAL unit. The color space identifier includes, as described above, information indicating a color space selected by the control unit 120. In this case, in actuality, an SEI NAL unit including the color space identifier is inserted in an access unit including an SPS NAL unit. Accordingly, since a color space identifier is included in an access unit including an SPS NAL unit, the access unit including the SPS NAL unit is read to enable simultaneous reading of a sequence parameter set and the color space identifier, and the information access time required for a reproducing apparatus can be reduced.

That is, in the MPEG-4 AVC standard, a sequence parameter set contains a VUI (Video Usability Information) parameter. The VUI parameter is data concerning video display information or the like, and includes, for example, information concerning a transformation matrix from RGB color signals to a luminance signal and a color-difference signal, etc. An SEI NAL unit in which a color space identifier is stored is included in an access unit including an SPS NAL unit, whereby information recorded in the color space identifier and a VUI parameter, which are information used for displaying a video signal, can be stored in the same access unit (AU). In this case, a reproducing apparatus can simultaneously read pieces of color information used for displaying a color image by reading the access unit, from the recording medium 135, and the required information access time can be reduced.

Figure 4B:
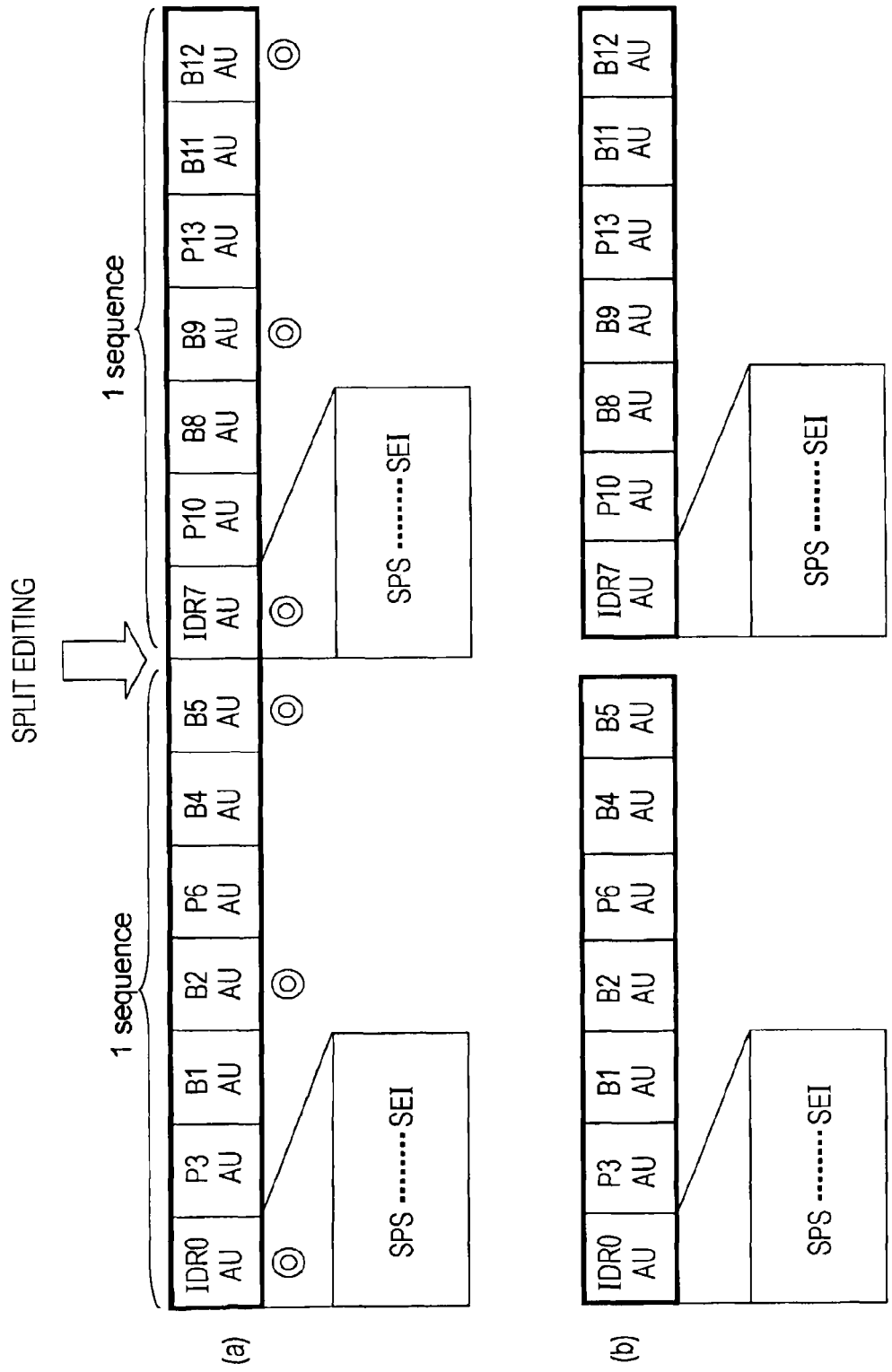
FIG. 4B is a diagram showing an example of splitting of a video stream at the time of split editing.

Furthermore, a sequence in which an access unit having an SPS NAL unit inserted therein is present at the beginning is used as a unit of editing. Thus, in a case where a stream is split, a case where a stream is merged with another stream, or a case where a portion of a stream is deleted, it is possible to read relevant color information, resulting in an improvement in editing performance such as improved splitting and merging. For example, parts (a) and (b) of FIG. 4B show an example of splitting of a video stream at the time of split editing. Part (a) of FIG. 4B shows a stream before the splitting, and part (b) of FIG. 4B shows a stream after the splitting. As shown in part (a) of FIG. 4B, a stream is split every sequence having at the beginning thereof an access unit in which an SPS NAL unit is inserted. Thus, as shown in part (b) of FIG. 4B, an access unit located at the beginning of each portion of the stream after the splitting always includes an SPS NAL unit and SEI NAL unit having color information.

FIG. 5 shows an example construction of a color space identifier. In the example construction shown in FIG. 5, the color space identifier contains, in addition to color space information that is information indicating a color space of a video signal to be recorded, information regarding color gamut, color precision information, and a reserved area. In the example construction shown in FIG. 5, the information regarding color gamut includes maximum and minimum values of the color gamut used for each of red (R), green (G), and blue (B) of a picture in an access unit having added thereto an SEI NAL unit in which the color space identifier is stored.

Note that information regarding color gamut may include a maximum value of the color gamut and the difference between the maximum value and a minimum value, or a minimum value of the color gamut and the difference between the minimum value and a maximum value, or other information. The color precision information is information indicating how precise the information regarding color gamut (maximum and minimum values) is (specifically, information indicating the number of bits representing the information regarding color gamut). The reserved area is reserved for future data expansion.

The color space identifier is generated by the CPU 121 of the control unit 120. The CPU 121 determines, by calculation, information regarding the color gamut of each of red (R), green (G), and blue (B) colors from a picture of a Coded Slice NAL unit within an access unit including an SEI NAL unit in which the color space identifier is stored.

As described below, in the imaging apparatus 100, compressed video signal obtained by performing data compression processing by the encoding/decoding unit 132 is recorded on the recording medium 135 via the media I/F 134. Subsequently, the compressed video signal recorded on the recording medium 135 in this way is read through the media I/F 134 as necessary. The read compressed video signal is subjected to, for example, data expansion processing and is then transferred together with the color space identifier from the external I/F (network interface) 139 to another device over a predetermined network.

Currently, a large number of network protocols by which devices are connected, such as IEEE 1394, USB 2.0, and HDMI 1.3, exist. If the color space identifier recorded on the recording medium 135 has a form incompatible with an output format of the network interface, it is necessary to convert the form of the color space identifier read from the recording medium 135 into a form compatible with the output format of the network interface when it is transferred over a network. In this case, a large load is imposed on the CPU 121 of the control unit 120, and there may be a risk of causing a problem in the transfer of a video signal.

In this embodiment, the CPU 121 generates a color space identifier in a form compatible with the output format of the network interface. In this case, when the video signal and color space identifier read from the recording medium 135 are sent to a network, it is not necessary for the CPU 121 to change the form of the color space identifier recorded on the recording medium 135, and it is possible to send them to the network with their form unchanged. The load imposed on the CPU 121 at the time of data transfer is reduced.

Note that in a case where the transfer of color information, like a color space identifier, is not specified by the standard of the network interface, the CPU 121 generates a color space identifier in a form complying with, for example, a user-defined-data transfer syntax. FIG. 6 shows an example construction of a color space identifier for a predetermined network interface A. The example construction shown in FIG. 6 is different in arrangement from the above-described example construction shown in FIG. 5, in which information regarding the overall data size of the color space identifier is further included. FIG. 7 shows an example construction of a color space identifier for a predetermined network interface B, which is compliant with the user-defined-data transfer syntax. In the user-defined-data transfer syntax, version information for the standard of the network interface B, a data size, and a data identifier (user-specific definition) indicating a color space identifier are included in the manner shown in FIG. 7, and information such as color space information, color precision information, a reserved area, and information regarding color gamut is stored as specific data.

The encoding/decoding unit 132 performs data compression processing so that, as described above, an access unit including an SPS NAL unit contains an SEI NAL unit in which a color space identifier including information indicating a selected color space is stored. In this case, the SEI NAL unit in which the color space identifier is stored may be contained in the access unit including the SPS NAL unit regardless of whether the control unit 120 selects a sRGB color space or an extended sRGB color space as the color space of the video signal to be recorded.

In this embodiment, however, the SEI NAL unit in which the color space identifier is stored is contained in the access unit including the SPS NAL unit only when the control unit 120 selects an extended sRGB color space as the color space of the video signal to be recorded. In this case, the CPU 121 generates a color space identifier (see FIGS. 5 to 7) only when an extended sRGB color space is selected as the color space of the video signal to be recorded. In this case, the compatibility with an existing product on which a video signal is recorded in a sRGB color space (on which no color space identifier is recorded) is maintained.

In the example constructions of the color space identifiers shown in FIGS. 5 to 7, information regarding the color gamut of a video signal is included. However, a color space identifier may not necessarily include information regarding the color gamut of the video signal. In a case where a color space identifier includes information regarding the color gamut of a video signal, a reproducing apparatus can use the information regarding the color gamut without performing processing of obtaining the information regarding the color gamut from the video signal, and a load imposed on the reproducing apparatus can be reduced.

Referring back to FIG. 1, the media I/F 134 records the compressed video signal obtained by performing data compression processing by the encoding/decoding unit 132 on the recording medium (memory card) 135 under control of the control unit 120. The media I/F 134 also reproduces a compressed video signal from the recording medium 135 under control of the control unit 120. At the time of imaging (at the time of recording), the LCD controller 137 drives the LCD 138 on the basis of the video signal supplied from the signal processing unit 131 to display a captured image (recorded image) on the LCD 138.

Figure 8:
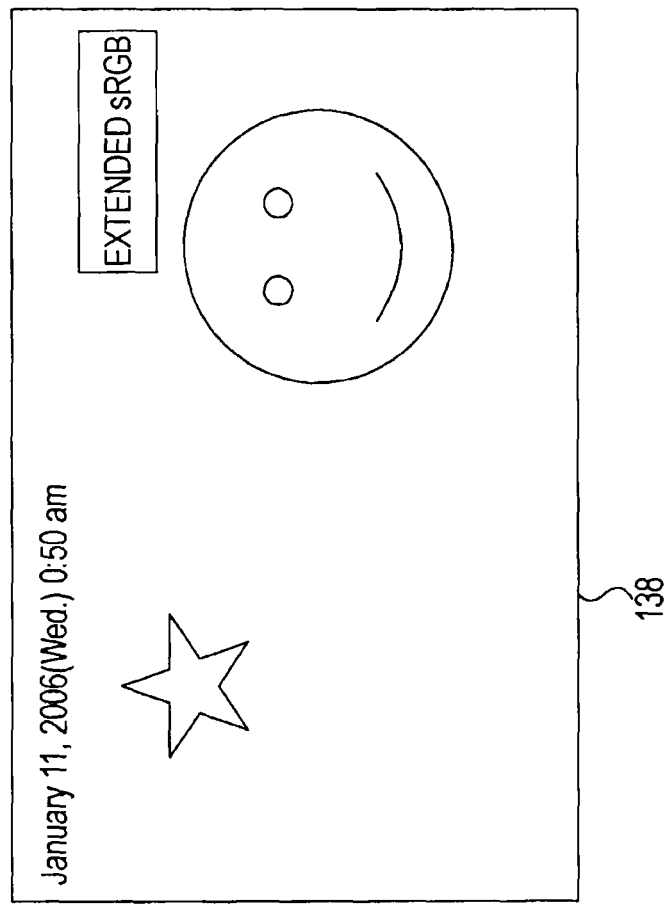
FIG. 8 is a diagram showing an example of display of a reproduced image (icon indicating a color space) at the time of reproduction.

In this case, the LCD controller 137 displays the reproduced image and an icon indicating what color space the reproduced video signal is mapped to in an OSD (on-screen display) form on the LCD 138 on the basis of the information indicating the color space included in the color space identifier (see FIGS. 5 to 7) recorded in association with the reproduced compressed video signal. FIG. 8 shows an example of a reproduced image displayed on the LCD 138, and an icon indicating that the color space of the reproduced video signal is an extended sRGB color space is displayed. Displaying the color space of the reproduced video signal as an icon on the LCD 138 in this manner helps ensure that a user can easily understand the color space of the video signal to be reproduced.

In a case where a video signal to be reproduced using the imaging apparatus 100 is supplied to a reproducing apparatus through a line input terminal (in FIG. 1, a line output terminal is not shown), color space information is not transferred to the reproducing apparatus. In this case, when an icon indicating a color space is displayed on the LCD 138 in the manner described above, a user recognizes the color space of the reproduced video signal through the icon and can manually make the optimum display settings of the reproducing apparatus.

The external I/F 139 constitutes a network interface. At the time of transfer of a video signal, the external I/F 139 transfers a video signal reproduced from the recording medium 135 through the media I/F 134 and the color space identifier to another device such as a personal computer over a predetermined network.

Figure 9:
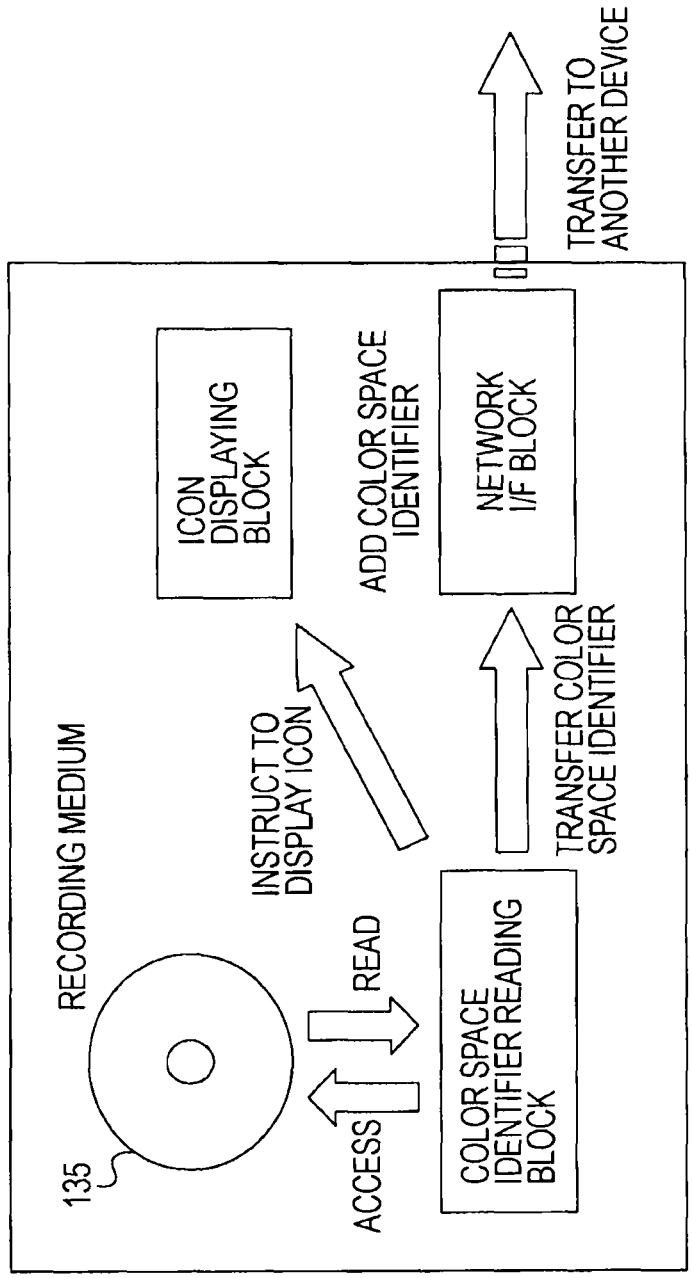
FIG. 9 is a diagram showing the flow of reading and transferring a color space identifier.

The flow diagram of FIG. 9 shows that a color space identifier is read from the recording medium 135, the color space of a reproduced video signal is displayed as an icon on the LCD 138 on the basis of the color space identifier, and the color space identifier is transferred to another device over a network. Note that, in FIG. 9, a color space identifier reading block, an icon displaying block, and a network I/F block are formed by the control unit 120, the media I/F 134, the LCD controller 137, the LCD 138, the external I/F 139, etc. The flow diagram of FIG. 9 is applicable not only to the imaging apparatus 100 shown in FIG. 1 but also to another reproducing apparatus (player) that reproduces a video signal from the recording medium 135.

Figure 10:
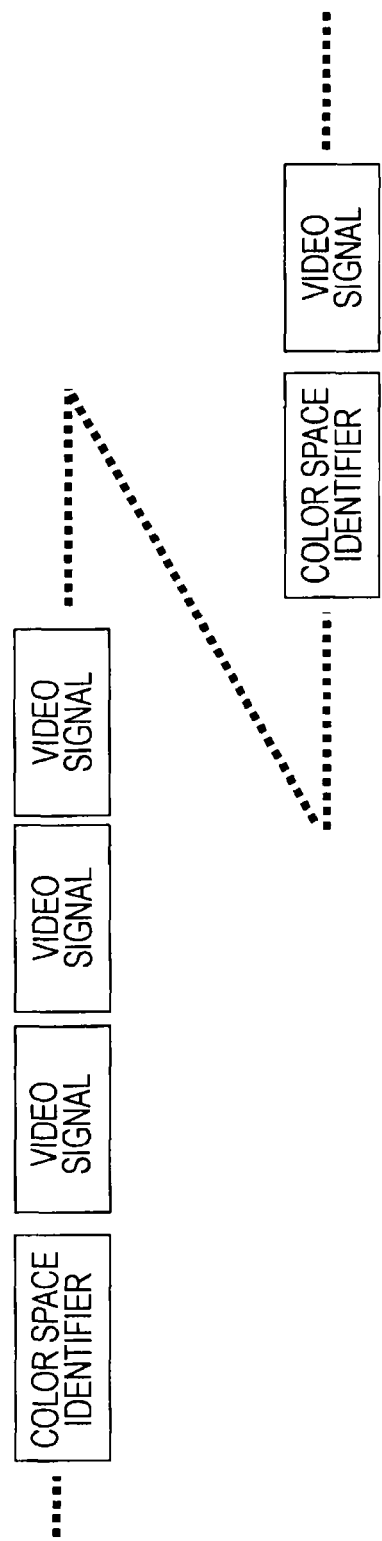
FIG. 10 is a diagram showing an example of data on a transfer path.

FIG. 10 shows an example of data on a transfer path. As described above, a color space identifier included in an SEI NAL unit is read from the recording medium 135 and is transferred at a predetermined timing from the network I/F block shown in FIG. 9.

The operation of the imaging apparatus 100 shown in FIG. 1 will be described. Image light from an object is irradiated onto an imaging surface of the imaging element 112 through the lens block 111, and an object image is formed on the imaging surface. In the imaging element 112, an image is captured in the state where the object image is formed on the imaging surface. An analog imaging signal output from the imaging element 112 is supplied to the pre-processing circuit 113 and is subjected to predetermined signal processing such as noise elimination, automatic gain control, and A/D conversion.

Digital video data (camera output data) output from the pre-processing circuit 113 of the camera unit 110 is supplied to the signal processing unit 131. In this signal unit 131, processing such as interpolation processing, filtering processing, matrix operation processing, luminance signal generation processing, and color-difference signal generation processing is performed on the camera output data, and a luminance signal Y and a color-difference signal Cr/Cb of the captured video signal are generated.

Here, if a user of the imaging apparatus 100 operates the operation unit 136 and specifies a sRGB color space as the color space of a video signal to be recorded, the sRGB color space is selected by the control unit 120 (CPU 121) as the color space of the video signal to be recorded. Then, under control of the control unit 120, a matrix coefficient for the linear matrix processing unit 155 (see FIG. 2) is set so that the target color space of the R signal, G signal, and B signal after the matrix operation becomes the sRGB color space. That is, if the user specifies a sRGB color space as the color space of the video signal to be recorded, the video signal (luminance signal Y and color-difference signal Cr/Cb) generated by the signal processing unit 131 is a video signal of the sRGB color space. Similarly, if the user specifies an extended sRGB color space as the color space of the video signal to be recorded, the video signal (luminance signal Y and color-difference signal Cr/Cb) generated by the signal processing unit 131 is a video signal of the extended sRGB color space.

At the time of imaging (at the time of recording), as described above, the video signal generated by the signal processing unit 131 is supplied to the LCD controller 137, and a captured image (recorded image) is displayed on the LCD 138 on the basis of the video signal. Note that although not described above, information for the color space of the recorded video signal specified by the user in the manner described above may be displayed together with the captured image on the LCD 138 in an OSD form.

At the time of imaging (at the time of recording), further, as described above, the video signal generated by the signal processing unit 131 is supplied to the encoding/decoding unit 132 and is subjected to data compression processing in accordance with the MPEG4-AVC standard to generate a compressed video signal. During this processing, an SEI NAL unit in which a color space identifier (see FIGS. 5 to 7) including information indicating a color space is stored is included in an access unit including an SPS NAL unit. Note that the color space identifier, which is generated by the CPU 121 of the control unit 120, is generated only when an extended sRGB color space, which has been specified by the user, is specified. That is, the color space identifier is added to the compressed video signal only when the color space of the video signal to be recorded is an extended sRGB color space.

The compressed video signal obtained by the encoding/decoding unit 132 is supplied to the media I/F 134 under control of the control unit 120, and is recorded on the recording medium 135 attached to the media I/F 134 through the media I/F 134.

At the time of reproduction, a predetermined compressed video signal is read from the recording medium 135 attached to the media I/F 134 through the media I/F 134. The compressed video signal read from the recording medium 135 in this way is supplied to the encoding/decoding unit 132 and is subjected to data expansion processing. Then, a reproduced video signal obtained by the encoding/decoding unit 132 is supplied to the LCD controller 137, and a reproduced image is displayed on the LCD 138 on the basis of the video signal. In this case, an icon indicating what color space the reproduced video signal is mapped to is displayed on the LCD 138 in an OSD form on the basis of the information indicating the color space included in the color space identifier (see FIGS. 5 to 7) recorded in association with the reproduced video signal. Note that the color space may be displayed as an icon only when the color space is an extended sRGB color space. In this case, the user can estimate that the color space of the reproduced video signal is a sRGB color space if an icon indicating a color space is not displayed.

At the time of transfer, under control of the control unit 120, a predetermined compressed video signal is read from the recording medium 135 through the media I/F 134. This compressed video signal is supplied to, for example, the encoding/decoding unit 132 and is subjected to data expansion processing. Then, a video signal and color space identifier obtained by the encoding/decoding unit 132 are transferred to another device such as a personal computer from the external I/F 139 over a predetermined network. In this case, as described above, since the color space identifier recorded so as to be added to the compressed video signal is generated in a form compatible with the standard of the network interface, it is not necessary to convert the form of the color space identifier obtained by the encoding/decoding unit 132, and the color space identifier is transferred to the network with the form thereof unchanged. In this case, as can be seen from the transfer flow of FIG. 9 in which a conversion block for converting the form is not shown, this conversion block is not necessary.

Figure 11:
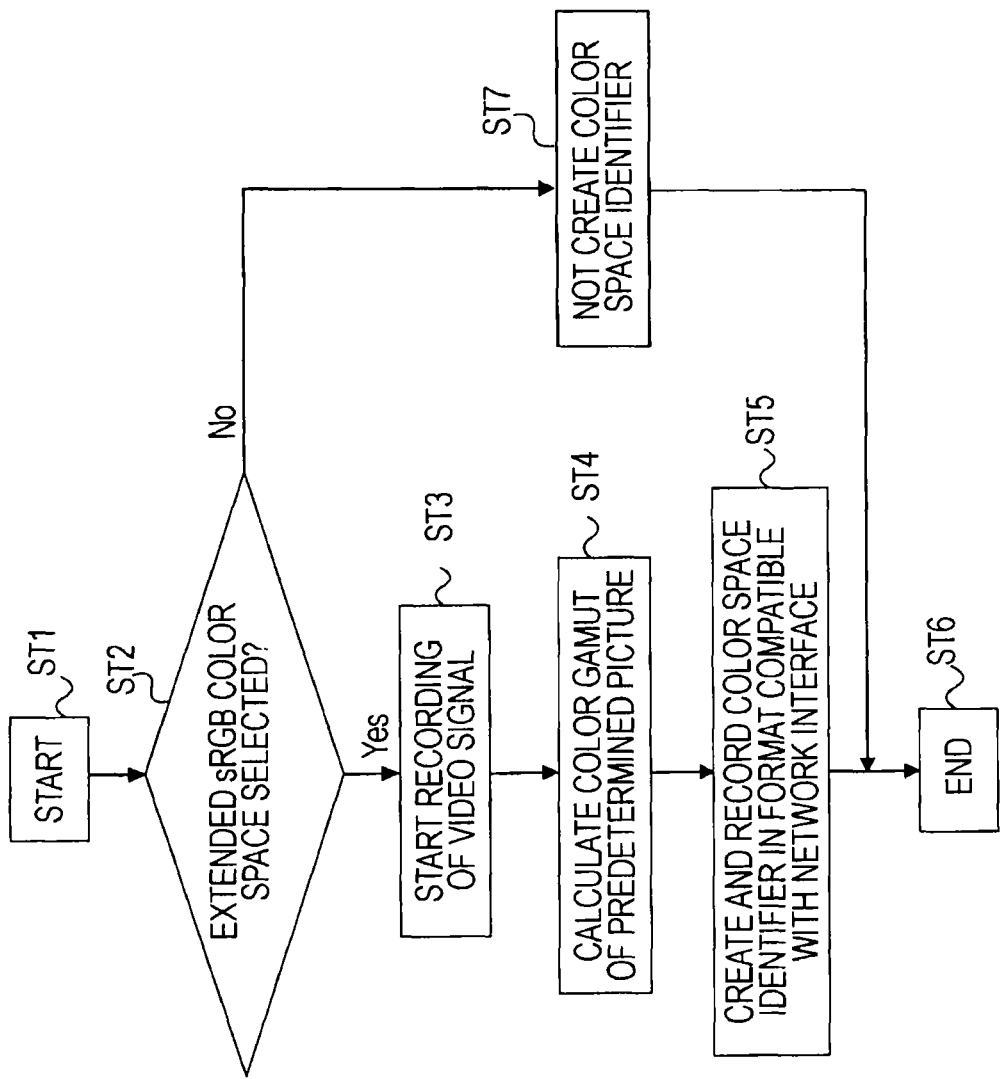
FIG. 11 is a flowchart showing a procedure of recording a color space identifier at the time of imaging (at the time of recording).

The flowchart of FIG. 11 shows a procedure of recording a color space identifier at the time of imaging (at the time of recording). The CPU 121 starts a process in step ST1, and then proceeds to step ST2. In step ST2, the CPU 121 determines whether or not an extended sRGB color space has been selected. When an extended sRGB color space has been selected, the CPU 121 starts recording of a video signal in step ST3, and determines information regarding the color gamut of a predetermined picture (a picture of an access unit including an SPS NAL unit) in step ST4.

Then, in step ST5, the CPU 121 creates a color space identifier in a form compatible with the network interface, and records an SEI NAL unit in which the color space identifier is stored so as to be included in an access unit including an SPS NAL unit of a compressed video signal. Subsequently, the CPU 121 repeatedly performs the processing of steps ST4 and ST5 during the recording of the video signal. When the recording of the video signal is finished, in step ST6, the CPU 121 ends the process.

Meanwhile, if an extended sRGB color space has not been selected in step ST2, that is, if a sRGB color space has been selected, the CPU 121 proceeds to step ST7. In step ST7, the CPU 121 does not create a color space identifier. In step ST6, the CPU 121 ends the process.

In the imaging apparatus 100 shown in FIG. 1, a user can specify either a sRGB color space or an extended sRGB color space as the color space of the video signal to be recorded. A video signal (luminance signal Y and color-difference signal Cb/Cr) corresponding to the specified color space is obtained from the signal processing unit 131. This video signal is subjected to data compression processing in accordance with the MPEG4-AVC standard by the encoding/decoding unit 132, and is recorded on the recording medium 135.

In the CPU 121 of the control unit 120, when the user specifies an extended sRGB color space as the color space of the video signal to be recorded, a color space identifier including information indicating the extended sRGB color space is generated. An SEI NAL unit in which the color space identifier is stored is included in an access unit including an SPS NAL unit in the compressed video signal generated by the encoding/decoding unit 132, and is recorded on the recording medium 135.

That is, in the imaging apparatus 100 shown in FIG. 1, when the color space of a video signal to be recorded is a sRGB color space, the video signal and a color space identifier are recorded in association with each other on the recording medium 135. Thus, a reproducing apparatus that reproduces a color image based on the video signal recorded on the recording medium 135 can easily determine the color space of the recorded video signal on the basis of the color space identifier recorded in association with the video signal.

Therefore, the reproducing apparatus that reproduces a color image based on the video signal recorded on the recording medium 135 can use the video signal in a state suitable for this reproducing apparatus on the basis of the above-described determination result, and can faithfully reproduce an original color of the video signal.

Figure 12:
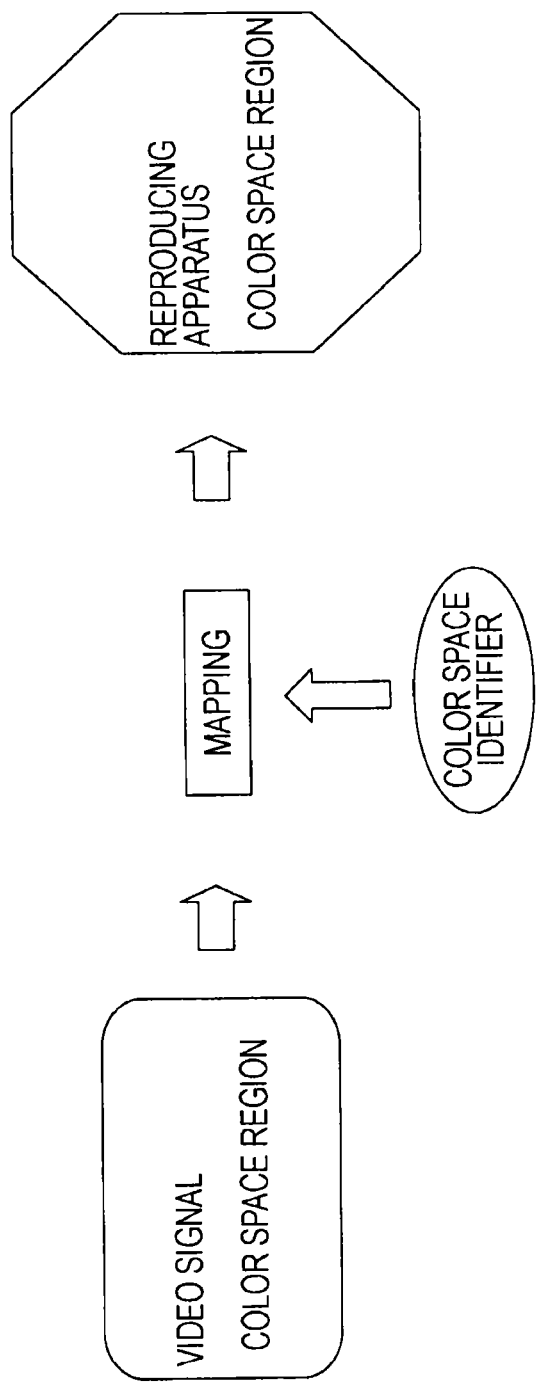
FIG. 12 is a diagram showing a concept of color range mapping in a reproducing apparatus.

FIG. 12 is a conceptual diagram of color range mapping in a reproducing apparatus. Once the reproducing apparatus recognizes a color space identifier, it can understand a color space of an input video signal, and can optimally map the input video signal in a form suitable for the color space region of the reproducing apparatus. It is possible to faithfully reproduce an original color of the recorded video signal. For example, mapping processing is performed so that a color space region of a video signal is within the color space region of the reproducing apparatus, thus making the video signal compatible with the reproducing apparatus.

Figure 13:
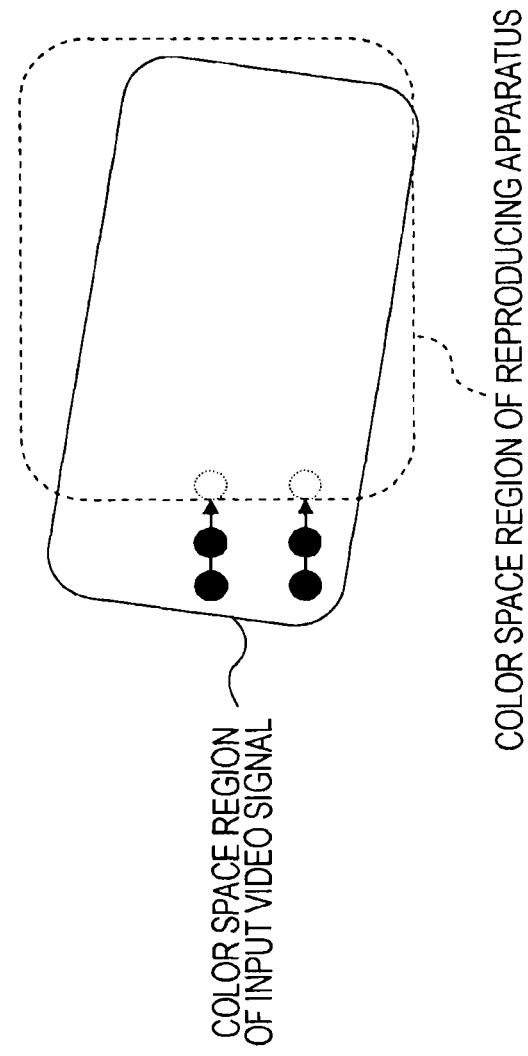
FIG. 13 is a diagram showing an example of clipping to the boundary of the color space region of a reproducing apparatus.
Figure 14:
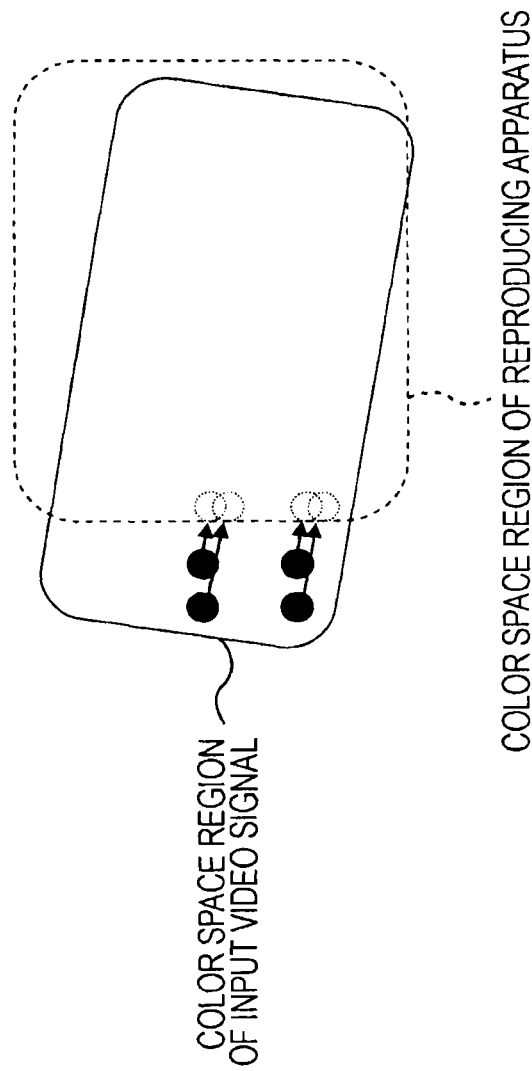
FIG. 14 is a diagram showing an example of mapping in accordance with the color space region of a reproducing apparatus.

FIG. 13 shows an example of existing clipping to the boundary of the color space region of the reproducing apparatus. "Black circles" represent pieces of color information of pixels constituting an input video signal, and "white circles" represent pieces of color information after the clipping. In contrast, FIG. 14 shows an example of mapping in accordance with the color space region of the reproducing apparatus on the basis of information included in a color space identifier. "Black circles" represent pieces of color information of pixels constituting an input video signal, and "white circles" represent pieces of color information after the mapping. In this example, among the pieces of color information of the pixels constituting the input video signal, a piece of color information outside the color space region of the reproducing apparatus is mapped to a point at which a straight line parallel to the boundary of the color space region of the input video signal and the boundary of the color space region of the reproducing apparatus intersect with each other.

Figure 15:
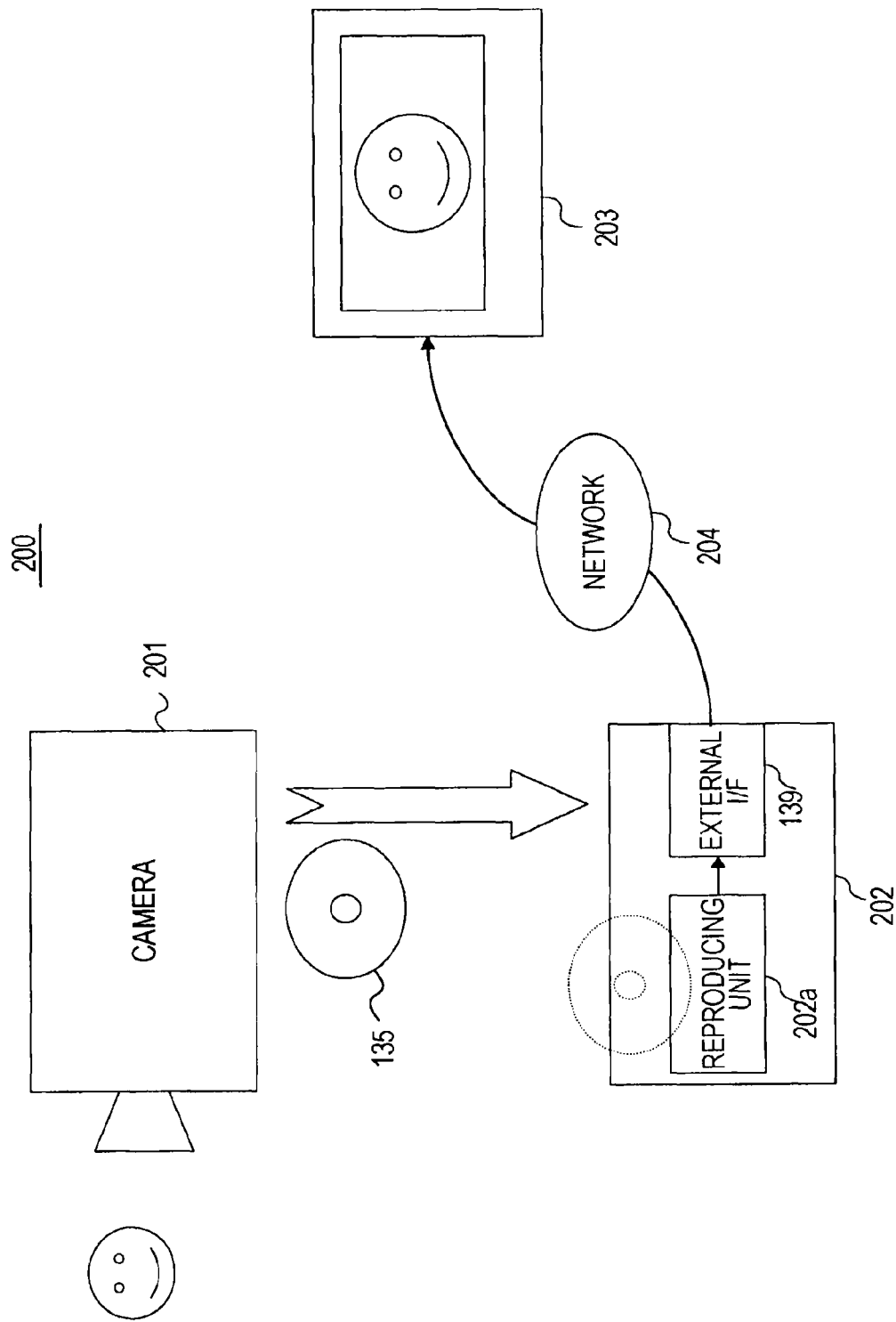
FIG. 15 is a block diagram showing a structure of a video system as another embodiment.

FIG. 15 shows a configuration of a video system 200 according to another embodiment of the present invention. In FIG. 15, portions corresponding to those of FIG. 1 are assigned the same reference numerals. The video system 200 includes a camera 201 that constitutes a recording apparatus, a player 202 that constitutes a reproducing apparatus, and a television receiver 203 used as an image display apparatus. The player 202 and the television receiver 203 are connected via a network 204 such as a LAN.

The camera 201, the details of which are not described herein, is configured in a manner similar to that of the imaging apparatus 100 shown in FIG. 1 described above. In the video system 200, a recording medium 135 on which a video signal and color space identifier are recorded in association with each other is attached to the player 202 for use.

The player 202 has the recording medium 135 attached thereto, and includes a reproducing unit 202a that reproduces the video signal and the color space identifier from the recording medium 135, and an external I/F (network interface) 139 that transfers the reproduced video signal and the color space identifier to the television receiver 203 via the network 204. In this case, the camera 201 generates a color space identifier in a form compatible with the output format of the network interface and records it on the recording medium 135. This allows the external I/F 139 to send the color space identifier reproduced from the recording medium 135 by the reproducing unit 202a to the network 204 with its form unchanged at a predetermined transfer timing. A conceptual diagram of data on the network 204 is as shown in FIG. 10.

The television receiver 203 displays an image using the video signal and color space identifier transferred from the player 202. The television receiver 203 maps (see FIG. 14) color information of pixels constituting the video signal according to the color space region of the television receiver 203 on the basis of information included in the color space identifier sent together with the video signal, and faithfully reproduces an original color of the video signal.

Note that the television receiver 203 obtains the color space identifier transmitted at the predetermined transfer timing from the external I/F 139 of the player 202 and performs mapping processing in accordance with the obtained color space identifier. This enables the television receiver 203 to faithfully reproduce an original color of the video signal without causing a problem even in a case where a video signal in which a plurality of video signals having different color spaces are merged is sent or any other case.

Figure 16:
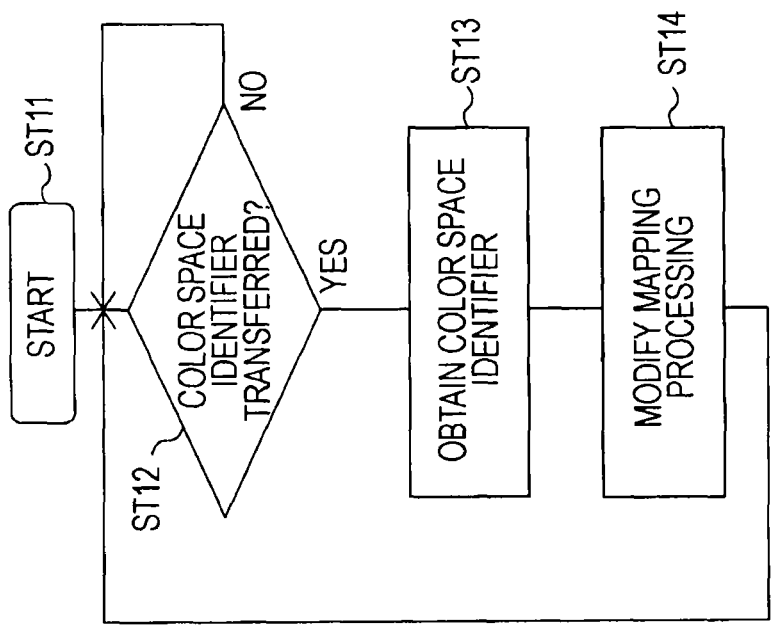
FIG. 16 is a flowchart showing a procedure of modifying mapping processing performed by a television receiver.
Figure 18A:
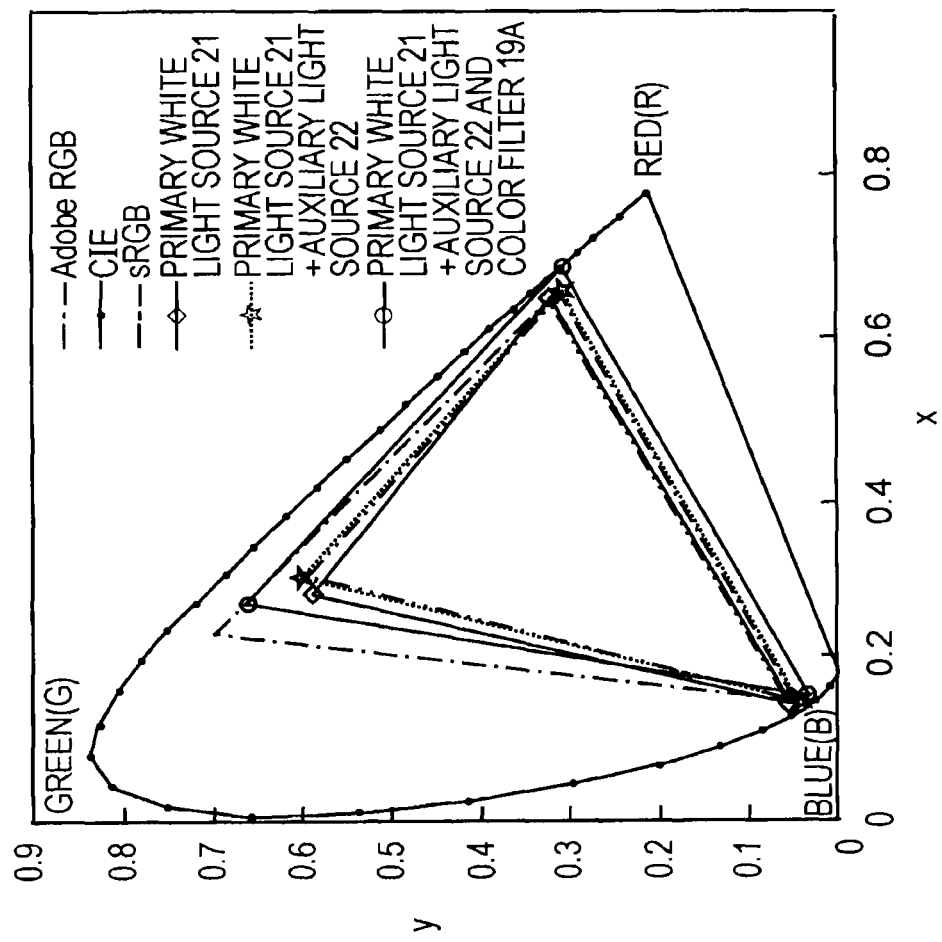
FIG. 18a is a diagram showing a color reproduction range in a case where a color filter is improved.
Figure 18C:
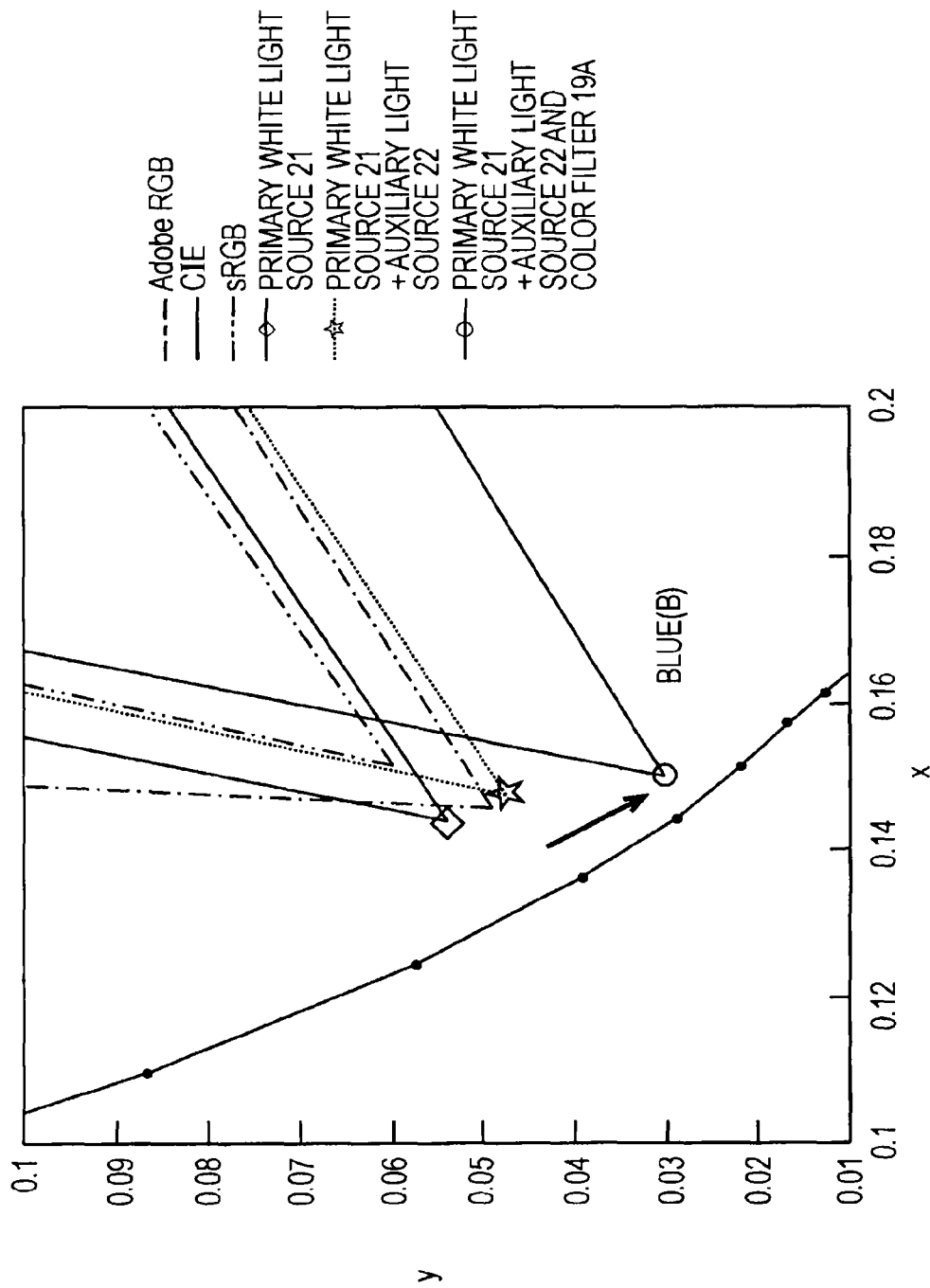
FIG. 18c is a diagram showing the color gamut of a blue (B) region shown in FIG. 18a to an enlarged scale.

The flowchart of FIG. 16 shows a procedure of modifying the mapping processing performed by the television receiver 203. The television receiver 203 starts a process in step ST11, and proceeds to step ST12. In step ST12, the television receiver 203 determines whether or not a color space identifier has been transferred. If a color space identifier has been transferred, the television receiver 203 proceeds to step ST13.

In step ST13, the television receiver 203 obtains the color space identifier. Then, the television receiver 203 proceeds to step ST14, and modifies mapping processing so that mapping processing in accordance with the color space identifier obtained in step ST13 can be performed. After step ST14, the television receiver 203 returns to step ST12, and proceeds to the determination of transfer of a subsequent color space identifier.

According to the foregoing embodiments, when a video signal corresponding to a predetermined color space obtained by processing a captured video signal is recorded on the recording medium 135, a color space identifier including information indicating the predetermined color space is generated and is recorded in association with the video signal. A reproducing apparatus can faithfully reproduce an original color of the recorded video signal.

According to the foregoing embodiments, furthermore, since a color space identifier exists in correspondence with an access unit (predetermined position of a video signal) including an SPS NAL unit of a video stream, no problem occurs even in a case where a video signal in which a plurality of video signals having different color spaces are merged is reproduced using a television receiver or the like. This results in an improvement in editing performance such as improved splitting and merging.

According to the foregoing embodiments, furthermore, a color space identifier includes information indicating a color space and information regarding the color gamut of a video signal (e.g., the maximum and minimum values of the color gamut), and a reproducing apparatus (e.g., the television receiver 203 shown in FIG. 15 or the like) connected via a network can use the information regarding the color gamut without performing processing of obtaining the information regarding the color gamut from the video signal, and can easily perform mapping processing suitable for this reproducing apparatus.

According to the foregoing embodiments, furthermore, a color space identifier is inserted in an access unit including an SPS NAL unit. Once the access unit is read, a sequence parameter set and a color space identifier, i.e., relevant color information, can be simultaneously read. The required information access time in the case of reproducing a video signal using a recording apparatus (e.g., the camera 201 shown in FIG. 15 or the like) that records it or in a reproducing apparatus (e.g., the player 202 shown in FIG. 15 or the like) can be reduced.

According to the foregoing embodiments, furthermore, a color space identifier is not generated when a sRGB color space is selected, and a color space identifier is generated when an extended sRGB color space is selected. The compatibility with an existing product on which a video signal is recorded in a sRGB color space as a specific color space (on which no color space identifier is recorded) can be maintained.

According to the foregoing embodiments, furthermore, a color space identifier is generated in a form compatible with the output format of a network interface and is recorded on the recording medium 135. When this color space identifier is sent to a network together with a video signal, it can be sent with its form unchanged, and a conversion block or the like is not necessary.

Note that in the foregoing embodiments, information regarding the color gamut of each of red (R), green (G), and blue (B) colors included in a color space identifier is determined by calculation from a picture of a Coded Slice NAL unit within an access unit including an SEI NAL unit in which the color space identifier is stored.

In the case of a mobile device with low recording performance, however, it is often difficult to determine, by calculation, information regarding the color gamut of each color from a picture corresponding to an access unit to which an SEI NAL unit is added.

Accordingly, for example, in the imaging apparatus 100 shown in FIG. 1, information regarding the color gamut (e.g., the maximum and minimum values of the color gamut) of each of red (R), green (G), and blue (B) in each color space (a sRGB color space or an extended sRGB color space) supported by the imaging apparatus 100 may be stored in the flash ROM 123 or the like. The CPU 121 may read the information regarding each color gamut from the flash ROM 123 or the like for use to generate a color space identifier.

In this case, color space identifiers added using SEI NAL units to the individual access units including SPS NAL units are the same unless a user changes a specified color space during the recording of a video signal. Also in this case, a reproducing apparatus can recognize color space information for the input video signal, information regarding color gamut, etc., on the basis of the color space identifiers. Thus, the reproducing apparatus can use the video signal in a state suitable for this reproducing apparatus and can faithfully reproduce an original color of the video signal.

Furthermore, the foregoing embodiments show that the encoding/decoding unit 132 performs data compression processing in accordance with the MPEG4-AVC standard, and an SEI NAL unit in which a color space identifier is stored is included in an access unit including an SPS NAL unit. In general, however, in a case where predetermined data compression processing is performed on a video signal to obtain a stream structure having a plurality of consecutive access units and to achieve a structure in which every sequence composed of a predetermined number of access units has a sequence parameter set including color information for the sequence, a structure in which an access unit including a sequence parameter set includes a color space identifier can achieve similar advantageous effects.

Note that an access unit including a color space identifier is not limited to an access unit including an SPS NAL unit. For example, access units including color space identifiers may be predetermined intermittently arranged access units irrespective of an access unit including an SPS NAL unit. For example, as marked with double circles in part (a) of FIG. 4B, access units including color space identifiers may be an access unit including an SPS NAL unit and access units located at intervals of a predetermined number of access units. In this case, all access units do not include SEI NAL units, and redundancy can be reduced.

Further, for example, all access units may be access units including SEI NAL units in which color space identifiers are stored. In this case, although redundancy is high, a video signal has information regarding the color gamut in every access unit, resulting in improved precision of color reproducibility in a reproducing apparatus.

Further, in the foregoing description, two examples of extended sRGB color spaces, those having a color space region indicated by "hollow stars" in FIGS. 17a to 17d and having a color space region indicated by "hollow circles" in FIGS. 18a to 18d, are illustrated. However, an extended sRGB color space is not limited to those, and that having any other color space region may be used.

According to the foregoing embodiments, furthermore, color spaces selectable by the CPU 121 in accordance with the user's specification are two color spaces, a sRGB color space and an extended sRGB color space. However, the present invention is also applicable in cases where a desired color space is selectable from among a large number of color spaces. In such cases, when a specific color space is selected, the generation and addition of a color space identifier may be omitted.

INDUSTRIAL APPLICABILITY

The present invention provides the ability to record a video signal on a recording medium so that a reproducing apparatus can faithfully reproduce an original color of the recorded video signal, and is applicable to, for example, an imaging apparatus that performs data compression on a captured video signal using the MPEG4-AVC standard and that records the resulting video signal on a recording medium, etc.

The invention claimed is:
1. A reproduction apparatus, comprising:
a reproducing circuit configured to
acquire a video stream including a video signal corresponding to a predetermined color space from a recording medium, the video stream including one or more sequences as edit units,
each of the sequences including a plurality of access units,
each of the access units including a predetermined number of Network Abstraction Layer (NAL) units, when the predetermined color space is a particular color space, the access units include a Supplemental Enhancement Information (SEI) NAL unit including a color space identifier which includes information corresponding to the particular color space, and the information corresponding to the particular color space includes at least color space information, color gamut information including maximum and minimum values of the color gamut, and color precision information specifying a precision of the color gamut, and reproduce the video signal and the color space identifier recorded on the recording medium; and an interface circuit that sends the video signal and the color space identifier reproduced by the reproducing circuit to a network at a predetermined transfer timing.

2. The reproduction apparatus according to claim 1, wherein the information corresponding to the particular color space is located at a predetermined position in the video stream.

3. The reproduction apparatus according to claim 2, wherein the predetermined position in the video stream corresponds to a Sequence Parameter Set (SPS) NAL unit.

4. The reproduction apparatus according to claim 1, wherein the reproduction unit causes a display unit connected to the network to display the video signal and the color space identifier.

5. The reproduction apparatus according to claim 1, wherein the color precision information includes a number of bits used to represent the information of the color gamut.

6. The reproduction apparatus according to claim 1, wherein the video signal corresponds to MPEG4-AVC.

7. The reproduction apparatus according to claim 1, wherein the color gamut information includes a minimum and a maximum value for each of red, green and blue colors.

8. A reproduction method, comprising:
acquiring, in a reproducing circuit, a video stream including a video signal corresponding to a predetermined color space from a recording medium, the video stream including one or more sequences as edit units, each of the sequences including a plurality of access units, each of the access units including a predetermined number of Network Abstraction Layer (NAL) units, when the predetermined color space is a particular color space, the access units include a Supplemental Enhancement Information (SEI) NAL unit including a color space identifier which includes information corresponding to the particular color space, and the information corresponding to the particular color space includes at least color space information, color gamut information including maximum and minimum values of the color gamut, and color precision information specifying a precision of the color gamut;

reproducing the video signal and the color space identifier recorded on the recording medium; and sending the reproduced video signal and the color space identifier to a network at a predetermined timing.

9. A non-transitory computer-readable medium encoded with computer-readable instructions thereon, the computer-readable instructions when executed by a computer cause the computer to perform a method according to claim 8.

10. An apparatus for displaying an image, comprising:
a mapping circuit configured to
acquire a video stream including a video signal corresponding to a predetermined color space through an interface, the video stream including one or more sequences as edit units, the sequences including a plurality of access units, each of the access units including a predetermined amount of Network Abstraction Layer (NAL) units, when the predetermined color space is a particular color space, the access unit includes a Supplemental Enhancement Information (SEI) NAL unit including a color space identifier including information corresponding to the particular color space, and the information of the particular color space includes at least color space information, color gamut information including maximum and minimum color gamut values, and color precision information specifying a precision of the color gamut, modify a color mapping process of the color space based on the color space identifier, and output the video stream based on the color mapping process to display the video stream.

11. The apparatus for displaying an image according to claim 10, wherein the information corresponding to the particular color space is located at a predetermined position in the video stream.

12. The apparatus for displaying an image according to claim 11, wherein the predetermined position in the video stream corresponds to a Sequence Parameter Set (SPS) NAL unit.

13. The apparatus for displaying an image according to claim 10, wherein the color precision information includes a number of bits used to represent the information of the color gamut.

14. The apparatus for displaying an image according to claim 10, wherein the video signal corresponds to MPEG4-AVC.

15. The apparatus for displaying an image according to claim 10, wherein the color gamut information includes a minimum and a maximum value for each of red, green and blue colors.

16. A method to cause an apparatus to display an image, comprising:
acquiring, in a mapping circuit, a video stream including a video signal corresponding to a predetermined color space through an interface, the video stream including one or more sequences as edit units, the sequences including a plurality of access units, each of the access units including a predetermined amount of Network Abstraction Layer (NAL) units, when the predetermined color space is a particular color space, the access unit includes a Supplemental Enhancement Information (SEI) NAL unit including a color space identifier including information corresponding to the particular color space, and the information of the particular color space includes at least color space information, color gamut information including maximum and minimum color gamut values, and color precision information specifying a precision of the color gamut, modifying a color mapping process of the color space based on the color space identifier; and outputting the video stream based on the color mapping process to display the video stream.

17. A non-transitory computer-readable medium encoded with computer-readable instructions thereon, the computer-readable instructions when executed by a computer cause the computer to perform a method according to claim 16.

* * * * *